United States Patent
Lazarev et al.

(10) Patent No.: US 10,872,733 B2
(45) Date of Patent: *Dec. 22, 2020

(54) YANLI MATERIAL AND DIELECTRIC AND CAPACITOR THEREOF

(71) Applicant: Capacitor Sciences Incorporated, Menlo Park, CA (US)

(72) Inventors: Pavel Ivan Lazarev, Menlo Park, CA (US); Paul Furuta, Sunnyvale, CA (US); Barry K. Sharp, Redwood City, CA (US); Yan Li, Fremont, CA (US)

(73) Assignee: CAPACITOR SCIENCES INCORPORATED, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,906

(22) Filed: Jan. 9, 2019

(65) Prior Publication Data

US 2019/0148082 A1 May 16, 2019

Related U.S. Application Data

(62) Division of application No. 15/449,587, filed on Mar. 3, 2017, now abandoned.

(60) Provisional application No. 62/318,134, filed on Apr. 4, 2016.

(51) Int. Cl.

| H01G 9/07 | (2006.01) |
|---|---|
| H01G 4/18 | (2006.01) |
| C08F 20/36 | (2006.01) |
| C08G 73/02 | (2006.01) |
| H01G 9/04 | (2006.01) |

(52) U.S. Cl.
CPC .............. H01G 9/07 (2013.01); C08F 20/36 (2013.01); C08G 73/024 (2013.01); H01G 4/18 (2013.01); H01G 9/04 (2013.01)

(58) Field of Classification Search
CPC ...................................................... H01G 9/07
USPC ........................................................ 546/37
See application file for complete search history.

(56) References Cited

U.S. PATENT DOCUMENTS

| 4,549,034 A | 10/1985 | Sato et al. |
|---|---|---|
| 4,894,186 A | 1/1990 | Gordon et al. |
| 5,141,837 A | 8/1992 | Nguyen et al. |
| 5,187,639 A | 2/1993 | Ogawa et al. |
| 5,248,774 A | 9/1993 | Dietz et al. |
| 5,286,803 A | 2/1994 | Lindsay et al. |
| 5,312,896 A | 5/1994 | Bhardwaj et al. |
| 5,395,556 A | 3/1995 | Drost et al. |
| 5,466,807 A | 11/1995 | Dietz et al. |
| 5,514,799 A | 5/1996 | Varanasi et al. |
| 5,583,359 A | 12/1996 | Ng et al. |
| 5,597,661 A | 1/1997 | Takeuchi et al. |
| 5,679,763 A | 10/1997 | Jen et al. |
| 6,025,094 A | 2/2000 | Visco et al. |
| 6,294,593 B1 | 9/2001 | Jeng et al. |
| 6,341,056 B1 | 1/2002 | Allman et al. |
| 6,391,104 B1 | 5/2002 | Schulz |
| 6,519,136 B1 | 2/2003 | Chu et al. |
| 6,617,830 B2 | 9/2003 | Nozu et al. |
| 7,025,900 B2 | 4/2006 | Sidorenko et al. |
| 7,211,824 B2 | 5/2007 | Lazarev |
| 7,342,755 B1 | 3/2008 | Horvat et al. |
| 7,625,497 B2 | 12/2009 | Carson et al. |
| 7,750,505 B2 | 7/2010 | Ichikawa |
| 7,795,431 B2 | 9/2010 | Pschirer et al. |
| 7,808,771 B2 | 10/2010 | Nguyen et al. |
| 7,893,265 B2 | 2/2011 | Facchetti et al. |
| 7,910,736 B2 | 3/2011 | Koenemann et al. |
| 7,990,679 B2 | 8/2011 | Ehrenberg et al. |
| 8,143,853 B2 | 3/2012 | Jestin et al. |
| 8,231,809 B2 | 7/2012 | Pschirer et al. |
| 8,344,142 B2 | 1/2013 | Marder et al. |
| 8,372,527 B2 | 2/2013 | Morishita et al. |
| 8,404,844 B2 | 3/2013 | Kastler et al. |
| 8,527,126 B2 | 9/2013 | Yamamoto et al. |
| 8,766,566 B2 | 7/2014 | Baba et al. |
| 8,831,805 B2 | 9/2014 | Izumi et al. |

(Continued)

FOREIGN PATENT DOCUMENTS

| CA | 2074848 A1 | 2/1998 |
|---|---|---|
| CN | 1582506 A | 2/2005 |

(Continued)

OTHER PUBLICATIONS

Warmerdam, T. W. et al. "Discotic Liquid Crystals. Physical Parameters of some 2, 3, 7, 8, 12, 13-hexa(alkanoyloxy) truxenes: Observation of a Reentrant Isotropic Phase in a Pure Disk-like mesogen." Liquid Crystals (1988), vol. 3, No. 8, pp. 1087-1104.
Non-Final Office Action dated Jun. 13, 2017 for U.S. Appl. No. 15/163,595.
Non-Final Office Action for U.S. Appl. No. 14/719,072, dated Aug. 2, 2017.
Non-Final Office Action for U.S. Appl. No. 15/043,247, dated Jun. 22, 2017
Non-Final Office Action for U.S. Appl. No. 15/043,247, dated Jun. 7, 2018.
Non-Final Office Action for U.S. Appl. No. 15/043,315, dated Dec. 26 2017.
Non-Final Office Action for U.S. Appl. No. 15/053,943, dated Apr. 19, 2017.

(Continued)

*Primary Examiner* — Nizal S Chandrakumar
(74) *Attorney, Agent, or Firm* — BCF LLP

(57) ABSTRACT

A composite oligomeric material includes one or more repeating backbone units. One or more polarizable units are incorporated into or connected to one or more of the one or more repeating backbone units. One or more resistive tails are connected to one or more of the repeating backbone units or to the one or more polarizable units as a side chain on the polarizable unit. The composite oligomer material may be polymerized to form a metadielectric, which may be sandwiched between to electrodes to form a metacapacitor.

22 Claims, 3 Drawing Sheets

(56) References Cited

U.S. PATENT DOCUMENTS

| | | | |
|---|---|---|---|
| 8,895,118 B2 | 11/2014 | Geivandov et al. | |
| 9,293,260 B2 | 3/2016 | Schmid et al. | |
| 9,589,727 B2 | 3/2017 | Lazarev et al. | |
| 9,899,150 B2 | 2/2018 | Lazarev et al. | |
| 9,916,931 B2 | 3/2018 | Lazarev | |
| 9,978,517 B2 | 5/2018 | Lazarev et al. | |
| 10,163,575 B1* | 12/2018 | Lazarev | H01G 7/06 |
| 10,319,523 B2* | 6/2019 | Li | H01G 9/04 |
| 10,340,082 B2* | 7/2019 | Lazarev | H01G 4/38 |
| 10,347,423 B2* | 7/2019 | Lazarev | H01G 4/228 |
| 2002/0027220 A1 | 3/2002 | Wang et al. | |
| 2003/0026063 A1 | 2/2003 | Munshi | |
| 2003/0103319 A1 | 6/2003 | Kumar et al. | |
| 2003/0105365 A1 | 6/2003 | Smith et al. | |
| 2003/0160595 A1 | 8/2003 | Provanzana et al. | |
| 2003/0219647 A1 | 11/2003 | Wariishi | |
| 2004/0173873 A1 | 9/2004 | Kumar et al. | |
| 2004/0222413 A1 | 11/2004 | Hsu et al. | |
| 2004/0223291 A1 | 11/2004 | Naito et al. | |
| 2006/0120014 A1 | 6/2006 | Nakamura et al. | |
| 2006/0120020 A1 | 6/2006 | Dowgiallo | |
| 2007/0001258 A1 | 1/2007 | Aihara | |
| 2007/0108940 A1 | 5/2007 | Sainomoto et al. | |
| 2007/0181973 A1 | 8/2007 | Hung et al. | |
| 2008/0002329 A1 | 1/2008 | Pohm et al. | |
| 2008/0150484 A1 | 6/2008 | Kimball et al. | |
| 2008/0266750 A1 | 10/2008 | Wu et al. | |
| 2008/0283283 A1 | 11/2008 | Abe et al. | |
| 2009/0184355 A1 | 7/2009 | Brederlow et al. | |
| 2010/0085521 A1 | 4/2010 | Kasianova et al. | |
| 2010/0172066 A1 | 7/2010 | Baer et al. | |
| 2010/0214719 A1 | 8/2010 | Kim et al. | |
| 2010/0269731 A1 | 10/2010 | Jespersen et al. | |
| 2010/0309606 A1 | 12/2010 | Allers et al. | |
| 2010/0309696 A1 | 12/2010 | Guillot et al. | |
| 2010/0315043 A1 | 12/2010 | Chau | |
| 2011/0006393 A1 | 1/2011 | Cui | |
| 2011/0042649 A1 | 2/2011 | Duvall et al. | |
| 2011/0079773 A1 | 4/2011 | Wasielewski et al. | |
| 2011/0110015 A1 | 5/2011 | Zhang et al. | |
| 2012/0008251 A1 | 1/2012 | Yu et al. | |
| 2012/0033342 A1 | 2/2012 | Ito et al. | |
| 2012/0059307 A1 | 3/2012 | Harris et al. | |
| 2012/0113380 A1 | 5/2012 | Geivandov et al. | |
| 2012/0122274 A1 | 5/2012 | Lazarev | |
| 2012/0268862 A1 | 10/2012 | Song et al. | |
| 2012/0274145 A1 | 11/2012 | Taddeo | |
| 2012/0302489 A1 | 11/2012 | Rodrigues et al. | |
| 2013/0056720 A1 | 3/2013 | Kim et al. | |
| 2013/0187475 A1 | 7/2013 | Vendik et al. | |
| 2013/0224473 A1 | 8/2013 | Tassell et al. | |
| 2013/0342967 A1 | 12/2013 | Lai et al. | |
| 2014/0035100 A1 | 2/2014 | Cho | |
| 2014/0036410 A1 | 2/2014 | Okamatsu et al. | |
| 2014/0098458 A1 | 4/2014 | Almadhoun et al. | |
| 2014/0158340 A1 | 6/2014 | Dixler et al. | |
| 2014/0169104 A1 | 6/2014 | Kan et al. | |
| 2014/0268490 A1 | 9/2014 | Tsai et al. | |
| 2014/0316387 A1 | 10/2014 | Harris et al. | |
| 2015/0008671 A1 | 1/2015 | Rentero et al. | |
| 2015/0008735 A1 | 1/2015 | Mizoguchi | |
| 2015/0249401 A1 | 9/2015 | Eriksen et al. | |
| 2015/0302990 A1 | 10/2015 | Ghosh et al. | |
| 2016/0001662 A1 | 1/2016 | Miller et al. | |
| 2016/0020026 A1 | 1/2016 | Lazarev | |
| 2016/0020027 A1 | 1/2016 | Lazarev | |
| 2016/0254092 A1 | 9/2016 | Lazarev et al. | |
| 2016/0314901 A1 | 10/2016 | Lazarev | |
| 2016/0340368 A1 | 11/2016 | Lazarev | |
| 2016/0379757 A1 | 12/2016 | Robinson et al. | |
| 2017/0117097 A1 | 4/2017 | Furuta et al. | |
| 2017/0133167 A1 | 5/2017 | Keller et al. | |
| 2017/0232853 A1 | 8/2017 | Lazarev et al. | |
| 2017/0233528 A1 | 8/2017 | Sharp et al. | |
| 2017/0236641 A1 | 8/2017 | Furuta et al. | |
| 2017/0236642 A1 | 8/2017 | Furuta et al. | |
| 2017/0236648 A1 | 8/2017 | Lazarev et al. | |
| 2017/0237271 A1 | 8/2017 | Kelly-Morgan et al. | |
| 2017/0237274 A1 | 8/2017 | Lazarev et al. | |
| 2017/0287637 A1 | 10/2017 | Lazarev et al. | |
| 2017/0287638 A1 | 10/2017 | Lazarev et al. | |
| 2017/0301467 A1 | 10/2017 | Lazarev et al. | |
| 2018/0033554 A1 | 2/2018 | Li et al. | |
| 2018/0061582 A1 | 3/2018 | Furuta et al. | |
| 2018/0122143 A1 | 5/2018 | Ellwood | |
| 2018/0126857 A1 | 5/2018 | Kelly-Morgan | |
| 2018/0137978 A1 | 5/2018 | Hein et al. | |
| 2018/0137984 A1 | 5/2018 | Furuta et al. | |
| 2018/0158616 A1 | 6/2018 | Lazarev et al. | |

FOREIGN PATENT DOCUMENTS

| | | |
|---|---|---|
| CN | 100449661 | 1/2009 |
| CN | 1748271 B | 6/2010 |
| CN | 102426918 A | 4/2012 |
| CN | 103261370 A | 8/2013 |
| CN | 203377785 U | 1/2014 |
| CN | 103755703 A | 4/2014 |
| CN | 103986224 A | 8/2014 |
| CN | 103258656 B | 8/2015 |
| DE | 102010012949 A1 | 9/2011 |
| EP | 0493716 A1 | 7/1992 |
| EP | 0585999 A1 | 3/1994 |
| EP | 0602654 A1 | 6/1994 |
| EP | 0729056 A1 | 8/1996 |
| EP | 0791849 A1 | 8/1997 |
| EP | 0986080 A3 | 1/2004 |
| EP | 2062944 A1 | 5/2009 |
| EP | 2108673 A1 | 10/2009 |
| EP | 1990682 B1 | 1/2015 |
| GB | 2084585 B | 11/1983 |
| JP | S6386731 A | 4/1988 |
| JP | 2000100484 A | 4/2000 |
| JP | 2001093778 A | 4/2001 |
| JP | 2010160989 A | 7/2010 |
| RU | 2199450 C1 | 2/2003 |
| RU | 2512880 C2 | 4/2014 |
| WO | 1990009616 A1 | 8/1990 |
| WO | 0139305 A1 | 5/2001 |
| WO | 2009144205 A1 | 12/2009 |
| WO | 2009158553 A2 | 12/2009 |
| WO | 2011137137 A1 | 11/2011 |
| WO | 2012084536 A1 | 6/2012 |
| WO | 2012142460 A1 | 10/2012 |
| WO | 2012162500 A2 | 11/2012 |
| WO | 2013009772 A1 | 1/2013 |
| WO | 2013085467 A1 | 6/2013 |
| WO | 2014009686 A1 | 1/2014 |
| WO | 2015175522 A1 | 11/2015 |
| WO | 2015175558 A2 | 11/2015 |

OTHER PUBLICATIONS

Non-Final Office Action for U.S. Appl. No. 15/090,509, dated Jun. 22, 2017.

Non-Final Office Action for U.S. Appl. No. 15/163,595, dated Jan. 17, 2018.

Non-Final Office Action for U.S. Appl. No. 15/194,224, dated Sep. 27, 2017.

Non-Final Office Action for U.S. Appl. No. 15/430,339, dated Jul. 11, 2018.

Non-Final Office Action for U.S. Appl. No. 15/430,307, dated Jul. 16, 2018.

Non-Final Office Action for U.S. Appl. No. 15/449,587, dated May 21, 2018.

Non-Final Office Action for U.S. Appl. No. 15/710,587, dated Jul. 3, 2018.

Non-Final Office Action for U.S. Appl. No. 15/782,752, dated Sep. 21, 2018.

Non-Final Office Action for U.S. Appl. No. 15/801,240, dated Oct. 19, 2018.

(56) References Cited

OTHER PUBLICATIONS

Non-Final Office Action for U.S. Appl. No. 15/805,016, dated Jun. 4, 2018.
Non-Final Office Action for U.S. Appl. No. 15/805,016, dated Month Day, Year.
Non-Final Office Action for U.S. Appl. No. 14/710,480, dated May 8, 2017.
Non-Final Office Action for U.S. Appl. No. 15/043,186, dated Jun. 2, 2017.
Non-Final/Final Office Action for U.S. Appl. No. 15/043,247, dated Feb. 20, 2018.
Non-Final/Final Office Action for U.S. Appl. No. 15/430,391, dated Jul. 20, 2018.
Notice of Allowance for U.S. Appl. No. 14/710,480, dated Nov. 24, 2017.
Notice of Allowance for U.S. Appl. No. 14/710,480, dated Jan. 11, 2018.
Notice of Allowance for U.S. Appl. No. 14/710,480, dated Oct. 6, 2017.
Notice of Allowance for U.S. Appl. No. 14/710,491, dated Oct. 24, 2016.
Notice of Allowance for U.S. Appl. No. 14/719,072, dated Nov. 16, 2017.
Notice of Allowance for U.S. Appl. No. 14/752,600, dated Nov. 24, 2017.
Notice of Allowance for U.S. Appl. No. 14/752,600, dated Dec. 4, 2017.
Notice of Allowance for U.S. Appl. No. 14/752,600, dated Jul. 27, 2017.
Notice of Allowance for U.S. Appl. No. 14/919,337, dated Jul. 19, 2017.
Notice of Allowance for U.S. Appl. No. 14/919,337, dated Mar. 5, 2018.
Notice of Allowance for U.S. Appl. No. 14/919,337, dated Nov. 8, 2017.
Notice of Allowance for U.S. Appl. No. 14/931,757, dated Dec. 29, 2017.
Notice of Allowance for U.S. Appl. No. 14/931,757, dated Feb. 8, 2018.
Notice of Allowance for U.S. Appl. No. 14/931,757, dated Jul. 17, 2017.
Notice of Allowance for U.S. Appl. No. 14/931,757, dated Oct. 31, 2017.
Notice of Allowance for U.S. Appl. No. 15/053,943, dated Aug. 14, 2017.
Notice of Allowance for U.S. Appl. No. 15/090,509, dated Jan. 24, 2018.
Notice of Allowance for U.S. Appl. No. 15/163,595, dated Jul. 30, 2018.
Office Action dated May 18, 2018 for Chinese Patent Application for Invention No. 201580025110.
Office Action dated Dec. 13, 2017 for Taiwan Patent Application No. 106104499.
Office Action dated Dec. 13, 2017 for Taiwan Patent Application No. 106104500.
Office Action dated Jan. 25, 2018 for Chinese Patent application No. 20158005146.4.
Office Action dated Oct. 19, 2017 for Taiwan patent Application No. 106104501.
Search Report and Written Opinion dated Feb. 7, 2018 for Singapore Patent Application No. 11201609435W.
Taiwan Office Action for TW Application No. 106104501, dated Oct. 19, 2017.
Trevethan, Thomas et al. "Organic Molecules Reconstruct Nanostructures on Ionic Surfaces." Small (2011), vol. 7, No. 9, pp. 1264-1270.
Updated Notice of Allowance for U.S. Appl. No. 14/710,480, dated Jan. 17, 2018.
Co-Pending U.S. Appl. No. 15/194,224, to Lazarev et al., filed Jun. 27, 2016.
Co-Pending U.S. Appl. No. 15/368,171, to Lazarev et al., filed Dec. 2 2016.
Co-Pending U.S. Application No. 15/430,307, to Lazarev et al, filed Feb. 10. 2017.
Co-Pending U.S. Appl. No. 15/449,587, to Lazarev et al., filed Mar. 3, 2017.
Co-Pending U.S. Appl. No. 15/675,614, to Kelly-Morgan, filed Aug. 11, 2017.
Co-Pending U.S. Appl. No. 15/710,587, to Li et al, filed Sep. 20, 2017.
Co-Pending U.S. Appl. No. 15/469,126, to Lazarev et al, filed Mar. 24, 2017.
D C Tiwari, et al: "Temperature dependent studies of electric and dielectric properties of polythiophene based nano composite", Indian Journal of Pure & Applied Physics vol. 50, Jan. 2012. pp. 49-56.
Deily, Dielectric and Optical Characterization of Polar Polymeric Materials: Chromophore Entrained PMMA Thin Films, Thesis, 2008.
Deruiter, J. Resonance and Induction Tutorial. Auburn University-Principles of Drug Action 1 Course Material. Spring 2005, 19 pages.
Extended European Search Report . 15792494.5, dated Dec. 11, 2017.
Extended European Search Report dated Aug. 8, 2018 for European Patent Application No. 16756391.5.
Extended European Search Report dated Sep. 24, 2018 for European Patent Application No. 15856609.1.
Extended European Search Report dated Sep. 26, 2018 for European Patent Application No. 16797411.2.
Extended European Search Report for Application No. 15792405.1, dated Nov. 10, 2017.
Final Office Action dated May 2, 2017.
Final Office Action for U.S. Appl. No. 15/043,247, dated Oct. 24, 2018.
Final Office Action for U.S. Appl. No. 15/043,247, dated Oct. 4, 2017.
Final Office Action for U.S. Appl. No. 15/043,249, dated Feb. 6, 2018.
Final Office Action for U.S. Appl. No. 15/043,315, dated Jun. 7, 2018.
Final Office Action for U.S. Appl. No. 15/194,224, dated Jan. 30, 2018.
Final Office Action for U.S. Appl. No. 15/449,587, dated Oct. 10, 2018.
Final Office Action for U.S. Appl. No. 15/710,587, dated Nov. 6, 2018.
Final Office Action for U.S. Appl. No. 14/919,337, dated May 1, 2017.
Handy, Scott T. "Ionic Liquids-Classes and Properties" Published Sep. 2011, Accessed Aug. 28, 2017, InTechweb.org.
Hsing-Yang Tsai et al, "1,6- and 1,7-Regioisomers of Asymmetric and Symmetric Perylene Bisimides: Synthesis, Characterization and Optical Properties" Molecules, 2014, vol. 19, pp. 327-341.
Hsing-Yang Tsai et al, "Synthesis and optical properties of novel asymmetric perylene bisimides", Journal of Luminescence, vol. 149, pp. 103-111 (2014).
International Search Report and Written Opinion dated Jul. 31, 2017 for International Patent Application No. PCT/US2017/024589.
International Search Report and Written Opinion for International Application No. PCT/US2016/019641, dated Jul. 12, 2016.
International Search Report and Written Opinion for International Application No. PCT/US2016/57765 , dated Jan. 5, 2017.
International Search Report and Written Opinion for International Application No. PCT/US2017/016862, dated Aug. 14, 2017.
International Search Report and Written Opinion for International Application No. PCT/US2017/017146, dated May 11, 2017.
International Search Report and Written Opinion for International Application No. PCT/US2017/017150, dated May 18, 2017.
International Search Report and Written Opinion for International Application No. PCT/US2017/24150, dated Jun. 21, 2017.
International Search Report and Written Opinion for International Application No. PCT/US2017/24371, dated Aug. 2, 2017.
International Search Report and Written Opinion for International Application No. PCT/US2017/24600, dated Aug. 14, 2017.

(56) References Cited

OTHER PUBLICATIONS

International Search Report and Written Opinion dated Feb. 23, 2018 for International Patent Application No. PCT/US17/64252.
International Search Report and Written Opinion dated Jun. 7, 2017 for International Application No. PCT/US2017/24589, to Pavel Ivan Lazarev, filed Jun. 7, 2017.
Isoda, Kyosuke et al. "Truxene-Based Columnar Liquid Crystals: Self-Assembled Structures and Electro-Active Properties." Chemistry—An Asian Journal (2009), vol. 4, No. 10, pp. 1619-1625.
Johnson, Kieth E. "What's an Ionic Liquid?" The Electrochemical Society Interface, Published Spring 2007, pp. 38-41, Accessed Aug. 28, 2017.
Li, Li-Li et al. "Synthesis and Mesomorphism of Ether-ester Mixed Tail C3-symmetrical Truxene discotic liquid crystals." Liquid Crystals(2010), vol. 37, No. 5, pp. 499-506.
Liang, Mao et al. "Synthesis and Photovoltaic Performance of Two Triarylamine Organic Dyes Based on Truxene." Yinyong Huaxue (2011) vol. 28 No. 12, pp. 1387-1392.
Lu, Meng et al. "Organic Dyes Incorporating Bis-hexapropyltruxeneamino Moiety for efficient Dye-sensitized Solar Cells." Journal of Physical Chemistry C (2011) vol. 115, No. 1, pp. 274-281.
M. Jurow et al, "Porphyrins as molectular electronic components of functional devices", Coordination Chemistry Reviews, Elsevier Science, Amsterdam NL, vol. 254, No. 19-20, Oct. 1, 2010, pp. 2297-2310.
Maddalena, Francesco "Why are Ionic Liquids, Liquids?" http://www.quora.com/why-are-ionic-liquids-liquids?, Published Jan. 26, 2017, Accessed Aug. 28, 2017.
Manukian, BK. 216. IR.—spektroskopische Untersuchungen in der Imidazol-Reihe. Helvetica Chimica Acta. 1965, vol. 48, page.
Manukian, BK. 216. IR.—spektroskopische Untersuchungen in der Imidazol-Reihe. Helvetica Chimica Acta. 1965, vol. 48, pp. 1999-2004.
Nagabrahmandachari et al. "Synthesis and Spectral Analysis of Tin Tetracarboxylates and Phosphinates" Indian Journal of Chemistry-Section A, 1995, vol. 34A, pp. 658-660.
Ni, Hai-Lang et al. "Truxene Discotic Liquid Crystals with Two Different Ring Substituents: Synthesis, Metamorphosis and High Charged Carrier Mobility ." Liquid Crystals, vol. 40, No. 3, pp. 411-420.
Non-Final Action for U.S. Appl. No. 15/043,186, dated Feb. 14, 2018.
Ding et al., "A Photoactive Polymer with Azobenzene Chromophore in the Side Chains", Macromolecules, vol. 40, No. 6, Mar. 1, 2007, pp. 2267-2270.
Zhou et al., "Conjugated Polymers of Rylene Diimide and Phenothiazine for n-Channel Organic Filed-Effect Transistors", Macromolecules, vol. 45, No. 10, May 22, 2012, pp. 4115-4121.
Supplementary European Search Report issued in corresponding European patent application No. 17779524.2 dated Nov. 7, 2019.

* cited by examiner

US 10,872,733 B2

YANLI MATERIAL AND DIELECTRIC AND CAPACITOR THEREOF

CLAIM OF PRIORITY

This application is a division of U.S. patent application Ser. No. 15/449,587, filed Apr. 4, 2016, which is incorporated herein by reference in its entirety. U.S. patent application Ser. No. 15/449,587 claims the benefit of U.S. Provisional Application No. 62/318,134 filed Apr. 4, 2016, which is hereby incorporated herein by reference in its entirety.

FIELD OF THE INVENTION

The present disclosure relates generally to passive components of electrical circuit and more particularly to a composite organic compound and capacitor based on this material and intended for energy storage. A capacitor is an energy storage device that stores an applied electrical charge for a period of time and then discharges it. It is charged by applying a voltage across two electrodes and discharged by shorting the two electrodes. A voltage is maintained until discharge even when the charging source is removed. A capacitor blocks the flow of direct current and permits the flow of alternating current. The energy density of a capacitor is usually less than for a battery, but the power output of a capacitor is usually higher than for a battery. Capacitors are often used for various purposes including timing, power supply smoothing, coupling, filtering, tuning and energy storage. Batteries and capacitors are often used in tandem such as in a camera with a flash. The battery charges the capacitor that then provides the high power needed for a flash. The same idea works in electric and hybrid vehicles where batteries provide energy and capacitors provide power for starting and acceleration.

BACKGROUND

A capacitor is a passive electronic component that is used to store energy in the form of an electrostatic field, and comprises a pair of electrodes separated by a dielectric layer. When a potential difference exists between the two electrodes, an electric field is present in the dielectric layer. An ideal capacitor is characterized by a single constant value of capacitance, which is a ratio of the electric charge on each electrode to the potential difference between them. For high voltage applications, much larger capacitors have to be used.

One important characteristic of a dielectric material is its breakdown field. This corresponds to the value of electric field strength at which the material suffers a catastrophic failure and conducts electricity between the electrodes. For most capacitor geometries, the electric field in the dielectric can be approximated by the voltage between the two electrodes divided by the spacing between the electrodes, which is usually the thickness of the dielectric layer. Since the thickness is usually constant it is more common to refer to a breakdown voltage, rather than a breakdown field. There are a number of factors that can dramatically reduce the breakdown voltage. In particular, the geometry of the conductive electrodes is important factor affecting breakdown voltage for capacitor applications. In particular, sharp edges or points hugely increase the electric field strength locally and can lead to a local breakdown. Once a local breakdown starts at any point, the breakdown will quickly "trace" through the dielectric layer until it reaches the opposite electrode and causes a short circuit.

Breakdown of the dielectric layer usually occurs as follows. Intensity of an electric field becomes high enough to "pull" electrons from atoms of the dielectric material and makes them conduct an electric current from one electrode to another. Presence of impurities in the dielectric or imperfections of the crystal structure can result in an avalanche breakdown as observed in semiconductor devices.

Another important characteristic of a dielectric material is its dielectric permittivity. Different types of dielectric materials are used for capacitors and include ceramics, polymer film, paper, and electrolytic capacitors of different kinds. The most widely used polymer film materials are polypropylene and polyester. Increasing dielectric permittivity allows for increasing volumetric energy density, which makes it an important technical task.

One method for creating dielectrics with high permittivity is to use highly polarizable materials which when placed in between two electrodes and subjected to an electric field can more easily absorb more electrons due to polarized ends of the molecule orienting toward oppositely charged electrodes. U.S. patent application Ser. No. 15/043,186 demonstrates a method of incorporating highly polarizable molecules into an oligomer to create such a dielectric material and is hereby incorporated in its entirety by reference. The article "Synthesis and spectroscopic characterization of an alkoxysilane dye containing C. I. Disperse Red 1" (Yuanjing Cui, Minquan Wang, Lujian Chen, Guodong Qian, Dyes and Pigments, 62 (2004) pp. 43-47) describe the synthesis of an alkoxysilane dye (ICTES-DR1) which was copolymerized by sol-gel processing to yield organic-inorganic hybrid materials for use as second-order nonlinear optical (NLO) effect. C. I. Disperse Red 1 (DR1) was attached to Si atoms by a carbamate linkage to provide the functionalized silane via the nucleophilic addition reaction of 3-isocyanatopropyl triethoxysilane (ICTES) with DR1 using triethylamine as catalyst. The authors found that triethylamine and dibutyltin dilaurate were almost equally effective as catalysts. The physical properties and structure of ICTES-DR1 were characterized using elemental analysis, mass spectra, 1H-NMR, FTIR, UV-visible spectra and differential scanning calorimetry (DSC). ICTES-DR1 displays excellent solubility in common organic solvents.

Second-order nonlinear optical (NLO) effects of organic molecules have been extensively investigated for their advantages over inorganic crystals. Properties studied, for example, include their large optical non-linearity, ultra fast response speed, high damage thresholds and low absorption loss, etc. Particularly, organic thin films with excellent optical properties have tremendous potential in integrated optics such as optical switching, data manipulation and information processing. Among organic NLO molecules, azo-dye chromophores have been a special interest to many investigators because of their relatively large molecular hyperpolarizability (b) due to delocalization of the p-electronic clouds. They were most frequently either incorporated as a guest in the polymeric matrix (guest-host polymers) or grafted into the polymeric matrix (functionalized polymers) over the past decade.

Chromophoric orientation is obtained by applying a static electric field or by optical poling. Whatever the poling process, poled-order decay is an irreversible process which tends to annihilate the NLO response of the materials and this process is accelerated at higher temperature. For device applications, the most probable candidate must exhibit inherent properties that include: (i) high thermal stability to withstand heating during poling; (ii) high glass transition temperature ($T_g$) to lock the chromophores in their acentric order after poling.

Most of the polymers, however, have either low $T_g$ or poor thermal stability which makes them unsuitable for direct use. To overcome these problems, one attractive approach is incorporating the nonlinear optical active chromophore into a polymerizable silane by covalent bond to yield an alkoxysilane dye which can be copolymerized via sol-gel processing to form organic-inorganic hybrid materials. The hydrolysis and condensation of functionalized silicon alkoxides can yield a rigid amorphous three-dimensional network which leads to slower relaxation of NLO chromophores. Therefore, sol-gel hybrid nonlinear optical materials have received significant attention and exhibited the desired properties. In this strategy, the design and synthesis of new network-forming alkoxysilane dye are of paramount importance and detailed investigation of them will offer great promise in the fabrication of new materials for second-order nonlinear optics that will eventually meet the basic requirements in building photonic devices.

In the article "Design and Characterization of Molecular Nonlinear Optical Switches" (Frederic Castet et. al., ACCOUNTS OF CHEMICAL RESEARCH, pp. 2656-2665, (2013), Vol. 46, No. 11), Castet et. al. illustrate the similarities of the experimental and theoretical tools to design and characterize highly efficient NLO switches but also the difficulties in comparing them. After providing a critical overview of the different theoretical approaches used for evaluating the first hyperpolarizabilities, Castet et. al. reported two case studies in which theoretical simulations have provided guidelines to design NLO switches with improved efficiencies. The first example presents the joint theoretical/experimental characterization of a new family of multi-addressable NLO switches based on benzazolo-oxazolidine derivatives. The second focuses on the photoinduced commutation in merocyanine-spiropyran systems, where the significant NLO contrast could be exploited for metal cation identification in a new generation of multiusage sensing devices. Finally, Castet et. al. illustrated the impact of environment on the NLO switching properties, with examples based on the keto-enol equilibrium in aniline derivatives. Through these representative examples, Castet et. al. demonstrated that the rational design of molecular NLO switches, which combines experimental and theoretical approaches, has reached maturity. Future challenges consist in extending the investigated objects to supramolecular architectures involving several NLO-responsive units, in order to exploit their cooperative effects for enhancing the NLO responses and contrasts.

Two copolymers of 3-alkylthiophene (alkyl=hexyl, octyl) and a thiophene functionalized with Disperse Red 19 (TDR19) as chromophore side chain were synthesized by oxidative polymerization by Marilú Chávez-Castillo et. al. ("Third-Order Nonlinear Optical Behavior of Novel Polythiophene Derivatives Functionalized with Disperse Red 19 Chromophore", Hindawi Publishing Corporation International Journal of Polymer Science, Volume 2015, Article ID 219361, 10 pages, http://dx.doi.org/10.1155/2015/219361). The synthetic procedure was easy to perform, cost-effective, and highly versatile. The molecular structure, molecular weight distribution, film morphology, and optical and thermal properties of these polythiophene derivatives were determined by NMR, FT-IR, UV-Vis GPC, DSC-TGA, and AFM. The third-order nonlinear optical response of these materials was performed with nanosecond and femtosecond laser pulses by using the third-harmonic generation (THG) and Z-scan techniques at infrared wavelengths of 1300 and 800 nm, respectively. From these experiments it was observed that although the TRD19 incorporation into the side chain of the copolymers was lower than 5%, it was sufficient to increase their nonlinear response in solid state. For instance, the third-order nonlinear electric susceptibility of solid thin films made of these copolymers exhibited an increment of nearly 60% when TDR19 incorporation increased from 3% to 5%. In solution, the copolymers exhibited similar two-photon absorption cross sections $\sigma_{2PA}$ with a maximum value of 8545 GM and 233 GM (1 GM=$10^{-50}$ cm$^4$ s) per repeated monomeric unit.

The theory of molecular nonlinear optics based on the sum-over-states (SOS) model was reviewed by Mark G. Kuzyk et. al. ("Theory of Molecular Nonlinear Optics", Advances in Optics and Photonics 5, 4-82 (2013) doi: 10.1364/AOP .5.000004). The interaction of radiation with a single wtp-isolated molecule was treated by first-order perturbation theory, and expressions were derived for the linear ($\alpha_{ij}$) polarizability and nonlinear ($\beta_{ijk}$, $\gamma_{ijkl}$) molecular hyperpolarizabilities in terms of the properties of the molecular states and the electric dipole transition moments for light-induced transitions between them. Scale invariance was used to estimate fundamental limits for these polarizabilities. The crucial role of the spatial symmetry of both the single molecules and their ordering in dense media, and the transition from the single molecule to the dense medium case (susceptibilities $\chi^{(1)}_{ij}$, $\chi^{(2)}_{ijk}$, $\chi^{(3)}_{ijkl}$), is discussed. For example, for $\beta_{ijk}$, symmetry determines whether a molecule can support second-order nonlinear processes or not. For non-centrosymmetric molecules, examples of the frequency dispersion based on a two-level model (ground state and one excited state) are the simplest possible for $\beta_{ijk}$ and examples of the resulting frequency dispersion were given. The third-order susceptibility is too complicated to yield simple results in terms of symmetry properties. It will be shown that whereas a two-level model suffices for non-centrosymmetric molecules, symmetric molecules require a minimum of three levels in order to describe effects such as two-photon absorption. The frequency dispersion of the third-order susceptibility will be shown and the importance of one and two-photon transitions will be discussed.

The promising class of (polypyridine-ruthenium)-nitrosyl complexes capable of high yield Ru—NO/Ru—ON isomerization has been targeted as a potential molecular device for the achievement of complete NLO switches in the solid state by Joelle Akl, Chelmia Billot et. al. ("Molecular materials for switchable nonlinear optics in the solid state, based on ruthenium-nitrosyl complexes", New J. Chem., 2013, 37, 3518-3527). A computational investigation conducted at the PBE0/6-31+G** DFT level for benchmark systems of general formula [R-terpyridine-Ru$^{II}$Cl$_2$(NO)](PF$_6$) (R being a substituent with various donating or withdrawing capabilities) lead to the suggestion that an isomerization could produce a convincing NLO switch (large value of the $\beta_{ON}/\beta_{OFF}$ ratio) for R substituents of weak donating capabilities. Four new molecules were obtained in order to test the synthetic feasibility of this class of materials with R=4'-p-bromophenyl, 4'-p-methoxyphenyl, 4'-p-diethylaminophenyl, and 4'-p-nitrophenyl. The different cis-(Cl,Cl) and trans-(Cl,Cl) isomers can be separated by HPLC, and identified by NMR and X-ray crystallographic studies.

Single crystals of doped aniline oligomers can be produced via a simple solution-based self-assembly method (see Yue Wang et. al., "Morphological and Dimensional Control via Hierarchical Assembly of Doped Oligoaniline Single Crystals", J. Am. Chem. Soc. 2012, v. 134, pp.

9251-9262). Detailed mechanistic studies reveal that crystals of different morphologies and dimensions can be produced by a "bottom-up" hierarchical assembly where structures such as one-dimensional (1-D) nanofibers can be aggregated into higher order architectures. A large variety of crystalline nanostructures including 1-D nanofibers and nanowires, 2-D nanoribbons and nanosheets, 3-D nanoplates, stacked sheets, nanoflowers, porous networks, hollow spheres, and twisted coils can be obtained by controlling the nucleation of the crystals and the non-covalent interactions between the doped oligomers. These nanoscale crystals exhibit enhanced conductivity compared to their bulk counterparts as well as interesting structure-property relationships such as shape-dependent crystallinity. Further, the morphology and dimension of these structures can be largely rationalized and predicted by monitoring molecule-solvent interactions via absorption studies. Using doped tetraaniline as a model system, the results and strategies presented by Yue Wang et. al. provide insight into the general scheme of shape and size control for organic materials.

Hu Kang et. al. detail the synthesis and chemical/physical characterization of a series of unconventional twisted π-electron system electro-optic (EO) chromophores ("Ultra-large Hyperpolarizability Twisted π-Electron System Electro-Optic Chromophores: Synthesis, Solid-State and Solution-Phase Structural Characteristics, Electronic Structures, Linear and Nonlinear Optical Properties, and Computational Studies", J. AM. CHEM. SOC. 2007, vol. 129, pp. 3267-3286). Crystallographic analysis of these chromophores reveals large ring-ring dihedral twist angles (80-89°) and a highly charge-separated zwitterionic structure dominating the ground state. NOE NMR measurements of the twist angle in solution confirm that the solid-state twisting persists essentially unchanged in solution. Optical, IR, and NMR spectroscopic studies in both the solution phase and solid state further substantiate that the solid-state structural characteristics persist in solution. The aggregation of these highly polar zwitterions is investigated using several experimental techniques, including concentration-dependent optical and fluorescence spectroscopy and pulsed field gradient spin-echo (PGSE) NMR spectroscopy in combination with solid-state data. These studies reveal clear evidence of the formation of centrosymmetric aggregates in concentrated solutions and in the solid state and provide quantitative information on the extent of aggregation. Solution-phase DC electric-field-induced second-harmonic generation (EFISH) measurements reveal unprecedented hyperpolarizabilities (nonresonant $\mu\beta$ as high as $-488,000\times10^{-48}$ esu at 1907 nm). Incorporation of these chromophores into guest-host poled polyvinylphenol films provides very large electro-optic coefficients ($r_{33}$) of ~330 pm/V at 1310 nm. The aggregation and structure-property effects on the observed linear/non-linear optical properties were discussed. High-level computations based on state-averaged complete active space self-consistent field (SA-CASSCF) methods provide a new rationale for these exceptional hyperpolarizabilities and demonstrate significant solvation effects on hyperpolarizabilities, in good agreement with experiment. As such, this work suggests new paradigms for molecular hyperpolarizabilities and electro-optics.

U.S. Pat. No. 5,395,556 (Tricyanovinyl Substitution Process for NLO Polymers) demonstrate NLO effect of polymers that specifies a low dielectric constant. U.S. patent application Ser. No. 11/428,395 (High Dielectric, Non-Linear Capacitor) develops high dielectric materials with non-linear effects. It appears to be an advance in the art to achieve non-linear effects through supramolecular chromophore structures that are insulated from each other that include doping properties in the connecting insulating or resistive elements to the composite organic compound. It further appears to be an advance in the art to combine composite organic compounds with non-linear effects that form ordered structures in a film and are insulated from each other and do not rely on forming self-assembled monolayers on a substrate electrode.

The production and use of oligomers of azo-dye chromophores with resistive tails is described in U.S. Patent Application 62/318,134 which is hereby incorporated in its entirety by reference.

Capacitors as energy storage device have well-known advantages versus electrochemical energy storage, e.g. a battery. Compared to batteries, capacitors are able to store energy with very high power density, i.e. charge/recharge rates, have long shelf life with little degradation, and can be charged and discharged (cycled) hundreds of thousands or millions of times. However, capacitors often do not store energy in small volume or weight as in case of a battery, or at low energy storage cost, which makes capacitors impractical for some applications, for example electric vehicles. Accordingly, it may be an advance in energy storage technology to provide capacitors of higher volumetric and mass energy storage density and lower cost.

A need exists to improve the energy density of capacitors while maintaining the existing power output. There exists a further need to provide a capacitor featuring a high dielectric constant sustainable to high frequencies where the capacitance is voltage dependent. Such a capacitor is the subject of the present disclosure. The capacitor of the present disclosure builds on past work on non-linear optical chromophores and non-linear capacitors comprising said chromophores.

In high frequency applications, it is often important that the capacitors used do not have high dielectric losses. In the case of ferroelectric ceramic capacitors with a high dielectric constant, the presence of domain boundaries and electrostriction provide loss mechanisms that are significant. In contrast, the high dielectric mechanism disclosed in this disclosure involves the movement of an electron in a long molecule and its fixed donor. This occurs extremely rapidly so that losses even at gigahertz frequencies are small.

A second very useful property of the type of capacitor disclosed in the disclosure is its non-linearity. In many applications, it is desirable to have a voltage sensitive capacitance to tune circuits and adjust filters. The disclosed capacitors have such a property; as the mobile electron moves to the far end of the chromophore as the voltage increases, its motion is stopped so that with additional voltage little change in position occurs. As a consequence, the increase in the electric moment of the dielectric is reduced resulting in a diminished dielectric constant.

A third useful property of the type of capacitor disclosed in the disclosure is its resistivity due to ordered resistive tails covalently bonded to the composite organic compound. In many instances, electron mobility is hindered by a matrix of resistive materials. Ordered resistive tails can enhance the energy density of capacitors by increasing the density of polarization units in organized structures such as lamella or lamella-like or micelle structures, while also limiting mobility of electrons on the chromophores. The ordered resistive tails may also crosslink to further enhance the structure of the dielectric film which can reduce localized film defects and enhance the film's breakdown voltage or field. Further, ordered resistive tails can improve solubility of the composite compound in organic solvents. Still further, the ordered resistive tails act to hinder electro-polar interactions between supramolecular structures formed from pi-pi stacking of the optionally attached polycyclic conjugated molecule.

If the resistive tails may be rigid in structure, thereby stabilizing pi-pi stacking by holding the individual ring system in place and stabilizing the overall material by preventing the presence of voids due to coiling of alkyl chains. This is described in greater detail in U.S. patent application Ser. No. 15/043,247, which is incorporated herein in its entirety by reference.

A fourth very useful property of the type of capacitor disclosed in the disclosure is enhancing the non-linear response of the chromophores by using non-ionic dopant groups to change electron density of the chromophores. Manipulation of the electron density of the chromophores can significantly increase the non-linear response which is useful for increasing the polarizability and the type of dopant groups on chromophores is also important to achieving enhanced non-linear polarization versus a neutral or deleterious effect on the non-linearity of the chromophore.

A fifth very useful property of the type of capacitor disclosed in the disclosure is enhancing the non-linear response of the chromophores by using non-ionic dopant connecting groups to change electron density of the chromophores. Manipulation of the electron density of the chromophores can significantly increase the non-linear response which is useful for increasing the polarization of the capacitor and thus energy density of said capacitor. However, placement and type of dopant connecting groups on chromophores is also important to achieving enhanced non-linear polarization versus a neutral or deleterious effect on the non-linearity of the chromophore.

SUMMARY

Figure 1:
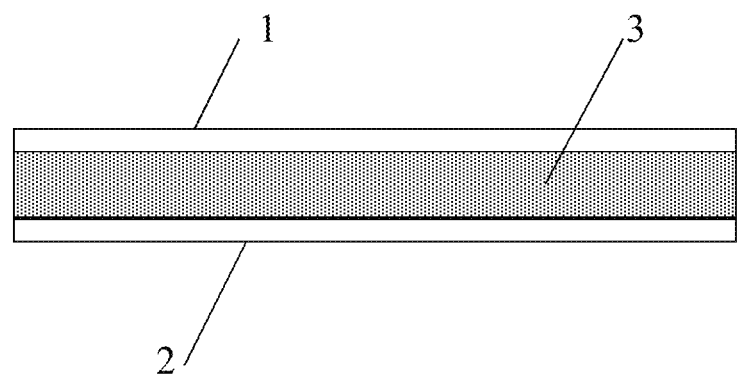
FIG. 1 shows a metacapacitor with two electrodes and a metadielectric according to aspects of the present disclosure.

Aspects of the present disclosure include a class of materials referred to herein as YanLi materials and YanLi oligomers. In general, a YanLi material is a composite oligomeric material comprised of monomers that have polarizable and insulating components. The monomers may include a polarizable unit having a non-linear polarizable core that includes a conjugated ring system and at least one dopant group. The monomers also include an insulating tail as a side chain on the polarizable unit, on the handle linking a polarizable unit to the monomer backbone, or directly attached to the monomer backbone. Additionally, the polarizable unit may be partially or fully incorporated into the monomer backbone. A particular subclass of YanLi materials are referred to herein as YanLi dielectrics, which are polymers of one or more YanLi materials.

One aspect of the present disclosure is to provide a capacitor with a high power output. A further aspect of the present disclosure is to provide a capacitor featuring a high dielectric constant sustainable to high voltage. A still further aspect of the present disclosure is to provide a capacitor featuring voltage dependent capacitance. In yet another aspect of the present disclosure, a method to make such a capacitor is provided.

The capacitor, in its simplest form, comprises a first electrode, a second electrode and a composite oligomer between the first electrode and the second electrode. The composite oligomer includes resistive tails and polarizable oligomer groups attached as a pendant to a monomer backbone or incorporated in a monomer backbone forming a composite monomer. The polarizable units on the monomer backbone may have dopant groups which can be independently selected from electron acceptor and electron donor groups separated by a conjugated ring system with or without a conjugated bridge. The conjugated bridge comprises one or more double bonds that alternate with single bonds in an unsaturated compound. Among the many elements that may be present in the double bond, carbon, nitrogen, oxygen and sulfur are the most preferred heteroatoms. The π electrons in the conjugated ring system are delocalized across the length of the ring system. Among the many types of resistive tails that may be present in the composite monomer, alkyl chains, branched alkyl chains, fluorinated alkyl chains, branched fluoroalkyl chains, poly(methyl methacrylate) chains are examples. When a bias is applied across the first and second electrodes, the composite oligomer becomes more or less polarized with electron density moving to compensate the field induced by the applied bias. When the bias is removed, the original charge distribution is restored. Typically, the capacitor comprises a plurality of YanLi oligomers (varying in length and/or type of monomer units) as a structured dielectric film.

DETAILED DESCRIPTION

According to aspects of the present disclosure an energy storage device, such as a capacitor, may include first and second electrodes selected from the group consisting of conductors and semiconductors. Conductors include, but are not limited to, metals, conducting polymers, carbon nanomaterials, and graphite including graphene sheets. Semiconductors include, but are not limited to, silicon, germanium, silicon carbide, gallium arsenide and selenium. The electrode may or may not be formed on a flat support. Flat supports may include, but are not limited to, glass, plastic, silicon, and metal surfaces.

The present disclosure provides a metacapacitor comprising two metal electrodes positioned parallel to each other and which can be rolled or flat and planar and a metadielectric layer between said electrodes and optionally an insolation layer. The metadielectric layer comprises the electro-polarizable compounds as disclosed below.

A metadielectric layer may be a film made from composite oligomers referred to herein as YanLi materials. Such a composite oligomeric material is characterized by a chemical structure that includes a repeating backbone unit, a polarizable unit, and a resistive tail. The polarizable unit may be incorporated into or connected as a pendant to the backbone unit and the resistive tail may be connected to the backbone unit or polarizable unit or a separate backbone unit. Nothing in the description, embodiments, and figures herein should suggest that these features must be separate aspects of the molecular structure. Many embodiments will have polarizable units that are not incorporated into the backbone, but it is indeed possible that portions or all of the backbone are part of the polarizable unit. The polarizable unit must possess a high degree of conjugation. Herein, we define "polarizable unit" to mean any multicyclic arrangement where electrons are delocalized over the entire portion of the chemical structure via conjugated single and double bonds. Herein, anisometric is defined as the condition of a molecule possessing charge or partial charge asymmetry along an axis. Possible, non-limiting, forms of this conjugation are polycyclic fused aromatic systems or a conjugated bridge where aromatic systems are connected by alternating single and double bonds.

Alternatively, the metadielectric layer maybe comprised of any organic composite oligomers, compounds, or polymers as disclosed in U.S. patent application Ser. No. 14/710, 491 filed May 12, 2015, Ser. No. 15/043,186 filed Feb. 12, 2016, Ser. No. 15/043,209 filed Feb. 12, 2016, Ser. No. 15/194,224 filed Jun. 27, 2016, Ser. No. 15/043,247 filed Feb. 12, 2016, Ser. No. 15/090,509 filed Apr. 4, 2016, and Ser. No. 15/163,595 filed May 24, 2016 all of which are entirely incorporated herein.

FIG. 1 illustrates an example of a metacapacitor having a first electrode 1, a second electrode 2, and a metadielectric layer 3 disposed between said first and second electrodes. The electrodes 1 and 2 may be made of a metal, such as copper, zinc, or aluminum or other conductive material such as graphite or carbon nanomaterials and are generally planar in shape.

The electrodes 1, 2 may be flat and planar and positioned parallel to each other. Alternatively, the electrodes may be planar and parallel, but not necessarily flat, they may be coiled, rolled, bent, folded, or otherwise shaped to form the capacitor. It is also possible for the electrodes to be non-flat, non-planar, or non-parallel or some combination of two or more of these. By way of example and not by way of limitation, a spacing d between the electrodes 1 and 2 may range from about 3 nm to about 100 µm. The maximum voltage $V_{bd}$ between the electrodes 1 and 2 is approximately the product of the breakdown field $E_{bd}$ and the electrode spacing d. If $E_{bd}$=0.1 V/nm and the spacing d between the electrodes 1 and 2 is 100 microns (100,000 nm), the maximum voltage $V_{bd}$ would be 10,000 volts.

Additionally, the metacapacitor may have an insulation layer to insulate electrodes 1 and 2 from making ohmic contact with each other in coiled, rolled, bent, and folded embodiments. Non-limiting examples of the insolation layer include metadielectric material, polypropylene (PP), polyethylene terephthalate polyester (PET), polyphenylene sulfide (PPS), polyethylene naphthalate (PEN), polycarbonate (PP), polystyrene (PS), and polytetrafluoroethylene (PTFE).

The electrodes 1 and 2 may have the same shape as each other, the same dimensions, and the same area A. By way of example, and not by way of limitation, the area A of each electrode 1 and 2 may range from about 0.01 m² to about 1000 m². By way of example and not by way of limitation for rolled capacitors, electrodes up to, e.g., 1000 m long and 1 m wide.

These ranges are non-limiting. Other ranges of the electrode spacing d and area A are within the scope of the aspects of the present disclosure.

If the spacing d is small compared to the characteristic linear dimensions of electrodes (e.g., length and/or width), the capacitance C of the capacitor may be approximated by the formula:

$$C = \varepsilon \varepsilon_o A/d, \quad (V)$$

where $\varepsilon_o$ is the permittivity of free space ($8.85 \times 10^{-12}$ Coulombs²/(Newton·meter²)) and $\varepsilon$ is the dielectric constant of the dielectric layer. The energy storage capacity U of the capacitor may be approximated as:

$$U = \tfrac{1}{2} \varepsilon \varepsilon_o A E_{bd}^2 d \quad (VI)$$

The energy storage capacity U is determined by the dielectric constant $\varepsilon$, the area A, the electrode spacing d, and the breakdown field $E_{bd}$. By appropriate engineering, a capacitor or capacitor bank may be designed to have any desired energy storage capacity U. By way of example, and not by way of limitation, given the above ranges for the dielectric constant $\varepsilon$, electrode area A, and breakdown field $E_{bd}$ a capacitor in accordance with aspects of the present disclosure may have an energy storage capacity U ranging from about 500 Joules to about $2 \cdot 10^{16}$ Joules.

For a dielectric constant $\varepsilon$ ranging, e.g., from about 100 to about 1,000,000 and constant breakdown field $E_{bd}$ between, e.g., about 0.1 and 0.5 V/nm, a capacitor of the type described herein may have a specific energy capacity per unit mass ranging from about 10 W·h/kg up to about 100,000 W·h/kg, though implementations are not so limited.

Alternatively, in some embodiments, electrodes 1 and 2 may have different shapes from each other with the same or different dimensions, and the same or different areas.

Figure 2A:
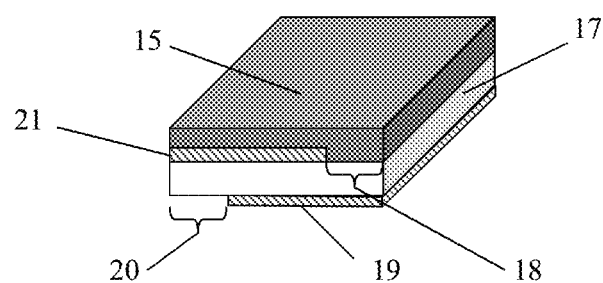
FIG. 2A shows a formation of two metal strips on top and bottom surfaces of the plastic layer for a coiled metacapacitor according to an aspect of the present disclosure.
Figure 2B:
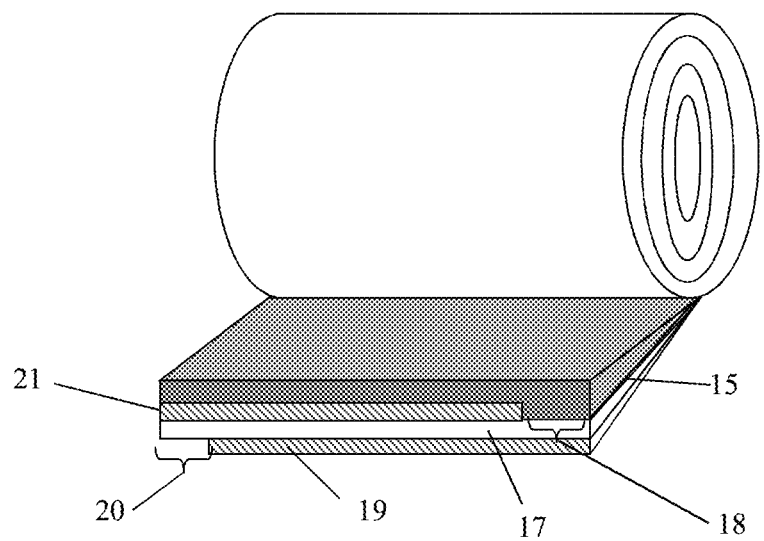
FIG. 2B shows a winding of the multilayered tape for a coiled metacapacitor according to an aspect of the present disclosure.
Figure 3:
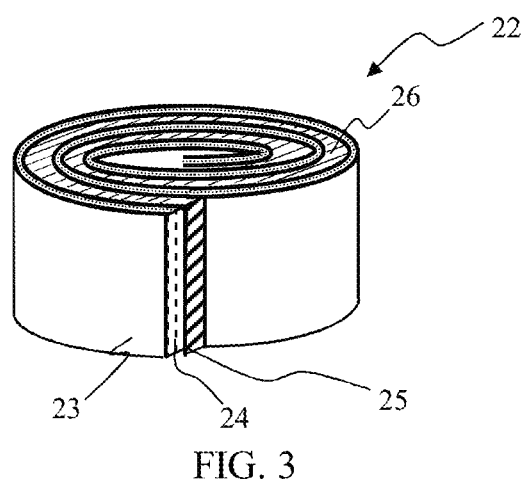
FIG. 3 shows a coiled film metacapacitor according to an aspect of the present disclosure.

The present disclosure includes metacapacitors that are coiled, e.g., as depicted in FIGS. 2A, 2B and 3. As shown in FIG. 2A, electrodes 19, 21, e.g., metal electrodes, are formed onto opposite surfaces of a metadielectric layer 17 with margin portions 18, 20 that are free of metal located on opposite edges of the metadielectric layer 17. In some embodiments, such a configuration of electrodes 19, 21 and metadielectric layer 17 form a tape or a multilayered tape. An electrically insulating layer 15, e.g., a plastic material is formed over one of the electrodes 21 or a plastic film is overlaid on one of the electrodes 21. The electrically insulating layer 15 may include metadielectric materials or common capacitor insulating materials such as PET. The metadielectric lay 17 may be formed, e.g., by applying a solution containing YanLi material to the electrode 19 and then drying the applied solution to form a solid layer of the YanLi material.

Alternatively, electrodes 19 and 21 may be formed onto opposite surfaces of an insulating layer 15 with margin portions 18, 20 that are free of electrode material located on opposite edges of the insulating layer 15. In some embodiments, such a configuration of electrodes 19, 21 and insulating layer 15 form a tape or a multilayered tape. The electrically insulating layer 15 may include metadielectric materials or common capacitor insulating materials such as PET. The metadielectric lay 17 may be formed, e.g., by applying a solution containing YanLi material to the electrode 19 and then drying the applied solution to form a solid layer of the YanLi material.

In some implementations, the applied YanLi material may be a polymerized solution of YanLi oligomers which is dried to form a metadielectric. In some implementations, the YanLi material may be polymerized to form a metadielectric. The thickness of the metadielectric layer may be a relatively uniformly thick layer. The metadielectric layer thickness may range from 0.1 µm to 50 µm depending on the desired maximum capacitor voltage. In general thicker metadielectric layers are used for higher maximum capacitor voltages. Furthermore, with a given metacapacitor the metadielectric layer thickness may vary due to normal manufacturing process variations, e.g., by about 1% to 10% of a nominal thickness value. In the example shown in FIG.

2A the first metal electrode 19 is formed on a portion of a first surface of the metadielectric layer 17 with a first margin portion 18 that is free of metal. The second electrode 21 is formed on a portion of a second surface of the plastic layer with a second margin portion 20 located on an opposite edge of the metadielectric layer 17 being free of metal. The multilayered structure depicted in FIG. 2A may be wound into a coil as shown in FIG. 2B. The insulating layer 15 prevents undesired electrical shorts between the first and second electrodes after being wound into the coil. By way of example and not by way of limitation, the insulating layer 15 may include a metadielectric material, polypropylene (PP), polyethylene terephthalate polyester (PET), polyphenylene sulfide (PPS), polyethylene naphthalate (PEN), polycarbonate (PP), polystyrene (PS), or polytetrafluoroethylene (PTFE).

Figure 4:
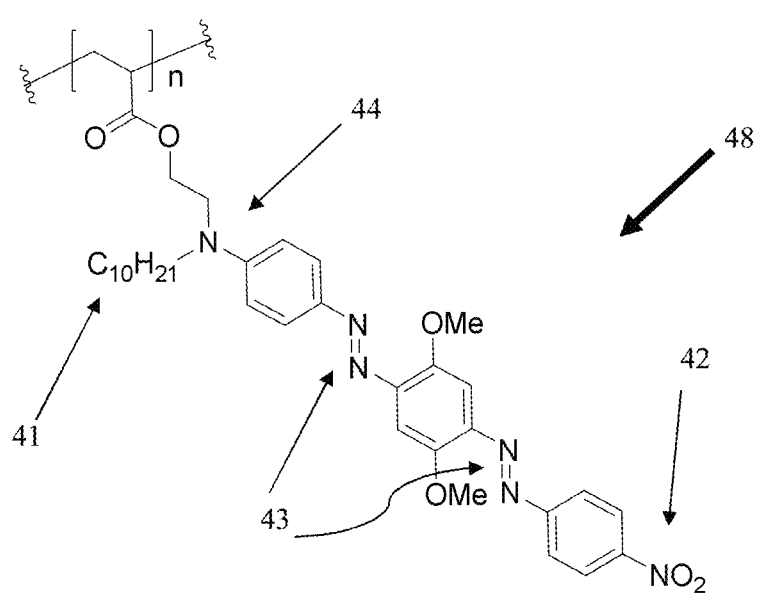
FIG. 4 shows an example of a chemical structure of a YanLi material that may be used to form a metadielectric for a metacapacitor according to aspects of the present disclosure.

In the example depicted in FIG. 4, a metacapacitor 22 comprises a first electrode 23, a second electrode 25, and a metadielectric material layer 24 of the type described herein disposed between said first and second electrodes. The electrodes 23 and 25 may be made of a metal, such as copper, zinc, or aluminum or other conductive material such as graphite or carbon nanomaterials and are generally planar in shape. In one implementation, the electrodes and metadielectric material layer 24 are in the form of long strips of material that are sandwiched together and wound into a coil along with an insulating material 26, e.g., a plastic film such as polypropylene or polyester to prevent electrical shorting between the electrodes 23 and 25. Alternatively, the insulating material may include a metadielectric layer comprised of any composite oligomer or polymer formed therefrom, as described herein below. Non-limiting examples of suitable coiled capacitors are described in and U.S. patent application Ser. No. 14/752,600 which is herein incorporated by reference in their entirety. In this aspect, the present invention provides a coiled capacitor comprising a coil formed by a flexible multilayered tape, and a first terminating electrode (a first contact layer) and a second terminating electrode (a second contact layer) which are located on butts of the coil. The flexible multilayered tape contains the following sequence of layers: first metal layer, a layer of a plastic, second metal layer, a layer of energy storage material. The first metal layer forms an ohmic contact with the first terminating electrode (the first contact layer) and the second metal layer (the second contact layer) forms an ohmic contact with the second terminating electrode. The layer of energy storage material may be any oligomer or polymer described herein FIG. 4 illustrates an example of the in the chemical structure of a YanLi material as a monomer of a polymer, wherein the polarizable unit is a doped chromophore 48, having an electron donor 44, two conjugated bridges 43, an electron acceptor 42; and where in the tail 41 is covalently bounded to the electron donor group 44. A composite oligomer forming the polarizable unit can have more than one electron donor 44, electron acceptor 42, and tail 41. In some embodiments, the composite oligomer forming the polarizable unit has an aromatic ring system in conjugation with a conjugated bridge. In some embodiments, the aromatic ring system consists of fused aromatic rings in conjugation. According to aspects of the present disclosure, a composite oligomer may comprise a mixture of molecules. A YanLi material made of monomers of the type shown in FIG. 4 may be polymerized to form a YanLi dielectric.

In one embodiment of the present disclosure, the layer's relative permittivity is greater than or equal to 1000. In another embodiment of the present disclosure, the polarization (P) of the metadielectric layer comprises first-order ($\varepsilon_{(1)}$) and second-order ($\varepsilon_{(2)}$) and third order ($\varepsilon_{(3)}$) permittivities according to the following formula:

$$P = \varepsilon_0(\varepsilon_1 - 1)E + \varepsilon_0\varepsilon_2 E^2 + \varepsilon_0\varepsilon_3 E^3 + \ldots$$

where P is the polarization of the material, which also can be represented by the following formula:

$$P = NP_{induced}$$

where $P_{induced}$ is the induced polarization which can be expressed by the formula:

$$P_{induced} = \alpha E_{loc} + \beta E_{loc}^2 + \gamma E_{loc}^3 + \ldots$$

where $E_{loc}$ is the localized field and is expressed by the formula:

$$E_{loc} = E + P/(3\varepsilon_0)$$

The real part of the relative permittivity ($\varepsilon'$) as can be seen from the above equations, also comprises first, second, and third order permittivities. Further, permittivity of a capacitor is a function of applied voltage and thickness of the capacitor's dielectric (d). Where voltage is the DC-voltage which is applied to the metadielectric layer, and d is the layer thickness. In another embodiment of the present invention, the layer's resistivity is greater than or equal to $10^{15}$ ohm cm. In yet another embodiment of the present invention, the layer's resistivity is between $10^{16}$ ohm cm and $10^{22}$ ohm cm.

In one embodiment, the composite oligomer comprises more than one type of resistive tails. In another embodiment, the composite oligomer comprises more than one type of ordered resistive tails. In yet another embodiment, the composite oligomer comprises at least one type of resistive tail or at least one type of ordered resistive tails.

In order that the invention may be more readily understood, reference is made to the following examples, which are intended to be illustrative of the invention, but are not intended to limit the scope.

In one embodiment, a liquid or solid composite oligomer is placed between the first and second electrodes. A solid chromophore is, for example, pressed into a pellet and placed between the first electrode and the second electrode. The chromophore can be ground into a powder before pressing.

In another embodiment, at least one type of YanLi material or YanLi oligomer may be dissolved or suspended in a solvent. The resultant material can be spin coated, extruded via slot die, roll-to-roll coated, or pulled and dried to form a dielectric film.

In another embodiment, a tailless composite oligomer may be dissolved or suspended in a polymer. This is termed a "guest-host" system where the oligomer is the guest and the polymer is the host. Polymer hosts include, but are not limited to, poly(methyl methacrylate), polyimides, polycarbonates and poly(ε-caprolactone). These systems are cross-linked or non-cross-linked.

In another embodiment, a tailless composite oligomer may be attached to a polymer. This is termed a "side-chain polymer" system. This system has the advantages over guest-host systems because high composite oligomer concentrations are incorporated into the polymer with high order and regularity and without phase separation or concentration gradients. Side chain polymers include, but are not limited to, poly[4-(2,2-dicyanovinyl)-N-bis(hydroxyethyl)aniline-alt-(4,4'-methylenebis(phenylisocyanate))] urethane, poly[4-(2,2-dicyanovinyl)-N-bis(hydroxyethyl) aniline-alt-(isophoronediisocyanate)]urethane, poly(9H-carbazole-9-ethyl acrylate), poly(9H-carbazole-9-ethyl methacrylate), poly(Disperse Orange 3 acrylamide), poly (Disperse Orange 3 methacrylamide), poly(Disperse Red 1 acrylate), poly(Disperse Red 13 acrylate), poly(Disperse Red 1 methacrylate), poly(Disperse Red 13 methacrylate), poly[(Disperse Red 19)-alt-(1,4-diphenylmethane urethane)], poly(Disperse Red 19-p-phenylene diacrylate), poly (Disperse Yellow 7 acrylate), poly(Disperse Yellow 7 methacrylate), poly[(methyl methacrylate)-co-(9-H-carbazole-9-ethyl acrylate)], poly[(methyl methacrylate)-co-(9-H-carbazole-9-ethyl methacrylate)], poly[methyl methacrylate-co-(Disperse Orange 3 acrylamide)], poly[methyl methacrylate-co-(Disperse Orange 3 methacrylamide)], poly[(methyl methacrylate)-co-(Disperse Red 1 acrylate)], poly[(methyl methacrylate)-co-(Disperse Red 1 methacrylate)], poly[(methyl methacrylate)-co-(Disperse Red 13 acrylate)], poly[(methyl methacrylate)-co-(Disperse Red 13 methacrylate)], poly[methyl methacrylate-co-(Disperse Yellow 7 acrylate)], poly[methyl methacrylate-co-(Disperse Yellow 7 methacrylate)], poly [[(S)-1-(4-nitrophenyl)-2-pyrrolidinemethyl]acrylate], poly[((S)-(–)-1-(4-nitrophenyl)-2-pyrrolidinemethyl)acrylate-co-methyl methacrylate], poly [[(S)-1-(4-nitrophenyl)-2-pyrrolidinemethyl]methacrylate] and poly[((S)-(–)-1-(4-nitrophenyl)-2-pyrrolidinemethyl)methacrylate-co-methyl methacrylate]. These systems are cross-linked or non-cross-linked.

In another embodiment, tailless composite oligomers may be embedded in matrices such as oxides, halides, salts and organic glasses. An example of a matrix is inorganic glasses comprising the oxides of aluminum, boron, silicon, titanium, vanadium and zirconium.

According to aspects of the present disclosure, the oligomers that make up a YanLi material may be aligned, partially aligned or unaligned. The composite oligomer is preferably aligned for optimal geometric configuration of polarizing units as this results in higher capacitance values in the capacitor. One method of alignment is to apply a DC electric field to the composite oligomer at a temperature at which the composite oligomer can be oriented. This method is termed "poling." Poling is generally performed near the glass transition temperature of polymeric and glassy systems. One possible method of poling is corona poling. Other methods of alignment could be roll-to-roll, Meyer bar, dip, slot die, and air knife coating of solutions and liquid crystal solutions of said side-chain polymers or composite oligomers.

In some instances, the side-chain polymer or composite oligomers may form liquid crystals in solution or solvent and with or without external influence. Non-limiting examples of liquid crystals include lyotropic and thermotropic liquid crystals. Non-limiting examples of external influences include heat, electric field, mechanical disturbances (e.g. vibration or sonication), and electromagnetic radiation. Said liquid crystals are supramolecular structures comprised of said side-chain polymers or composite oligomer in solution or solvent and are ordered and aligned or partially ordered or partially aligned. Such liquid crystal materials may be coated onto a substrate, e.g., by roll-to-roll, Meyer bar, dip, slot die, or air knife coating in a process that includes mechanical ordering of the liquid crystals, and drying of the liquid crystal solution or evaporation of the solvent such that the liquid crystals form a crystalline or semi-crystalline layer or film of metadielectric material.

By way of example, and not by way of limitations, structures 1-4 in Table 1 below are possible general structures for YanLi materials. In Table 1, the term "Polar Unit" is equivalent to polarizable unit as defined above, "t" is an integer representing the number of repeat units of the oligomeric material, and "n" and "m" are integers representing the number of subunits present in the composite oligomeric material.

TABLE 1

Examples of the composite oligomeric material general structure

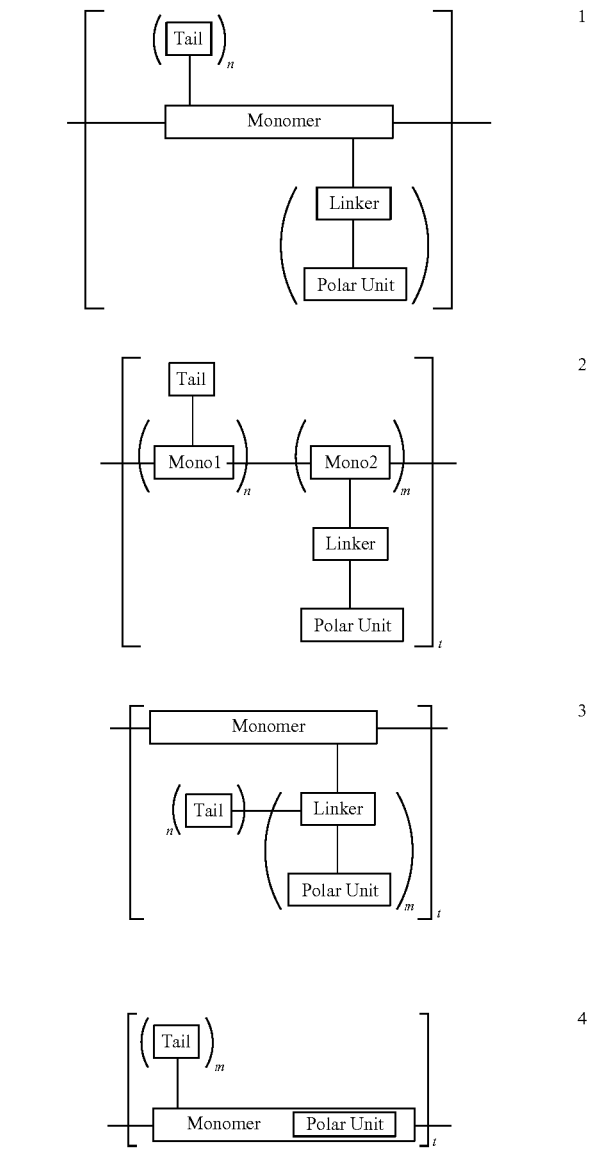

In the case of polycyclic aromatic systems, rylene fragments are a possible implementation of the polarizable unit. Some non-limiting examples of the use of rylene fragments as the polarizable unit are listed in Table 2. These polarizable units could be incorporated as sidechains to the oligomer via a wide variety of linkers or used as crosslinking agents to join polymers into a polymer network. Use of rylenes in capacitors is described in greater detail in U.S. patent application Ser. No. 14/919,337, which is incorporated herein in its entirety by reference. Table 2 includes examples of rylene fragments, wherein the repeat unit can range from 0 to 8 repeats.

TABLE 2

Examples of the polycyclic organic compound comprising rylene fragments

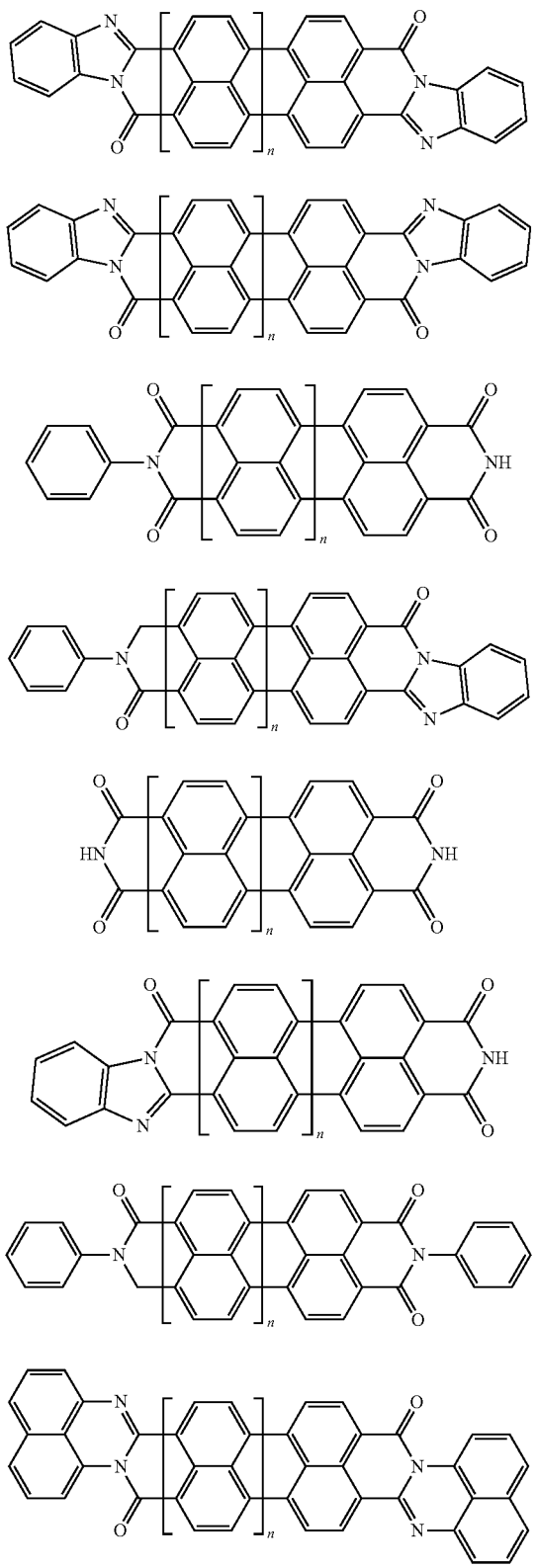
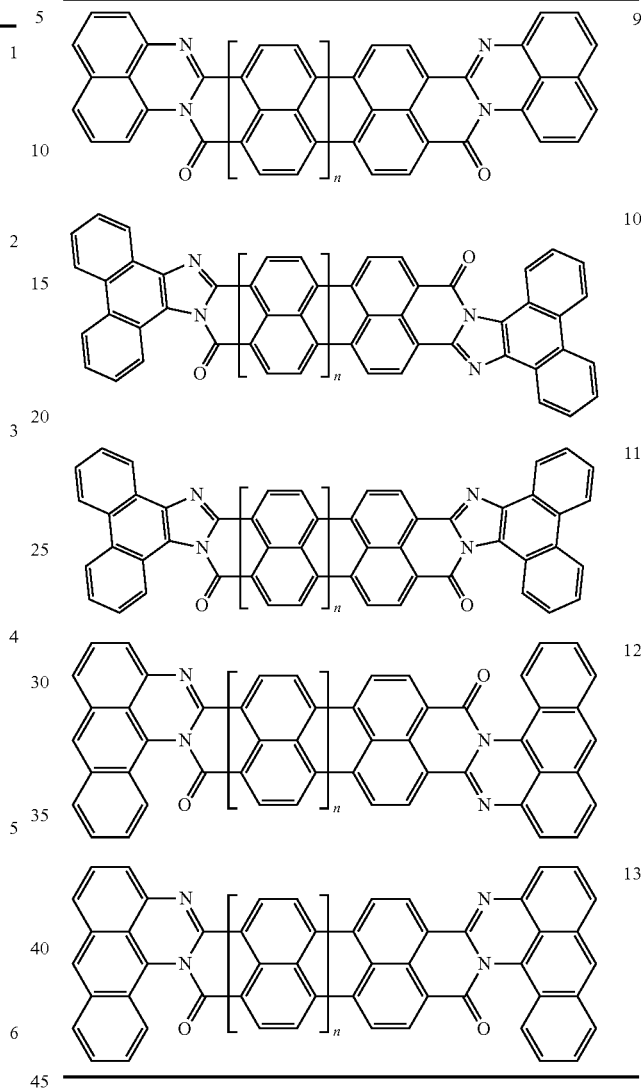

The rylene fragments may be made further polarizable by adding a variety of functional groups to various positions of the structure. Incorporating electron donors and electron acceptors is one way to enhance the polarizability. Electrophilic groups (electron acceptors) are selected from —NO$_2$, —NH$_3^+$ and —NR$_3^+$ (quaternary nitrogen salts), counterion Cl$^-$ or Br$^-$, —CHO (aldehyde), —CRO (keto group), —SO$_3$H (sulfonic acids), —SO$_3$R (sulfonates), SO$_2$NH$_2$ (sulfonamides), —COOH (carboxylic acid), —COOR (esters, from carboxylic acid side), —COCl (carboxylic acid chlorides), —CONH$_2$ (amides, from carboxylic acid side), —CF$_3$, CCl$_3$, —CN, wherein R is radical selected from the list comprising alkyl (methyl, ethyl, isopropyl, tert-butyl, neopentyl, cyclohexyl etc.), allyl (—CH$_2$—CH=CH$_2$), benzyl (—CH$_2$C$_6$H$_5$) groups, phenyl (+substituted phenyl) and other aryl (aromatic) groups. Nucleophilic groups (electron donors) are selected from —O$^-$ (phenoxides, like —ONa or —OK), —NH$_2$, —NHR, —NR$_2$, —NRR', —OH, OR (ethers), —NHCOR (amides, from amine side), —OCOR (esters, from alcohol side), alkyls, —C$_6$H$_5$, vinyls, wherein R and R' are radicals independently selected from the list comprising alkyl (methyl, ethyl, isopropyl, tert-butyl, neopentyl, cyclohexyl etc.), allyl (—CH2-CH=CH2), benzyl (—CH2C6H5) groups, phenyl (+substituted phenyl) and other aryl (aromatic) groups. Preferred electron donors include, but are not limited to, amino and phosphino groups and combinations thereof. Preferred electron acceptors include, but are not limited to, nitro, carbonyl, oxo, thioxo, sulfonyl, malononitrile, isoxazolone, cyano, dicyano, tricyano, tetracyano, nitrile, dicarbonitrile, tricarbonitrile, thioxodihydropyrimidinedione groups and combinations thereof. More conjugated bridges include, but are not limited to, 1,2-diphenylethene, 1,2-diphenyldiazene, styrene, hexa-1,3,5-trienylbenzene and 1,4-di(thiophen-2-yl)buta-1,3-diene, alkenes, dienes, trienes, polyenes, diazenes and combinations thereof.

Existence of the electrophilic groups (acceptors) and the nucleophilic groups (donors) in the aromatic polycyclic conjugated molecule promotes increase of electronic polarizability of these molecules. Under the influence of external electric field electrons are displaced across the polarizable unit to compensate the electric field. The nucleophilic groups (donors) and the electrophilic groups (acceptors) add to the electron density of the polarizable unit, which increases polarizability of such molecules and ability to form compensating electric field counter in the presence of an electric field. Thus, a distribution of electronic density in the molecules is non-uniform. The presence of the polarizable units leads to increasing of polarization ability of the disclosed material because of electronic conductivity of the polarizable units. Ionic groups may increase polarization of the disclosed YanLi material. The polarizable units can be nonlinearly polarizable and may be comprised of an aromatic polycyclic conjugated molecule with at least one dopant group, the polarizable units and are placed into a resistive envelope formed by resistive substituents. In some instances, the resistive substituents provide solubility of the organic compound in a solvent and act to electrically insulate supramolecular structures comprised of the YanLi material from neighboring supramolecular structures of the YanLi material. A non-centrosymmetric arrangement of the dopant group(s) can lead to a strong nonlinear response of the compound's electronic polarization in the presence of an electric field. Additionally, an anisometric molecule or polarizing unit can lead to a strong nonlinear response of the compound's electronic polarization in the presence of an electric field. Resistive substituents (e.g. resistive tails described above) increase the electric strength of these electro-polarizable compounds and breakdown voltage of the dielectric layers made on their basis.

An example of attachment of a rylene fragment to a polymer chain is shown below.

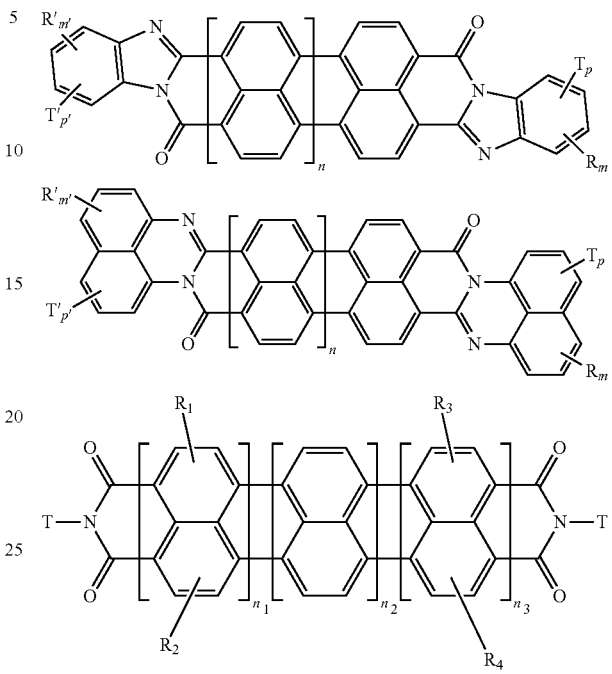

In the example shown above it is readily apparent that one or both ends of the rylene fragment may be attached to a polymer chain via T, $T_p$, or $T'_p$, and may be functionalized for better polarizability at $R_m$, $R'_m$, $R_1$, $R_2$, $R_3$, or $R_4$. The preferred but non-limiting range for n, $n_1$, $n_2$, and $n_3$ are between 0 and 8, with the proviso that the rylene fragment needs at least one naphthalene unit in order to be considered a rylene fragment and n, $n_1$, $n_2$, and $n_3$ are independently selected from said range of integers.

Rylene fragments may also be fused with anthracene structures at the nitrogen containing ends. Some non-limiting examples are shown below. These species will similarly benefit in polarizability by the addition of dopant groups, as illustrated in the examples below.

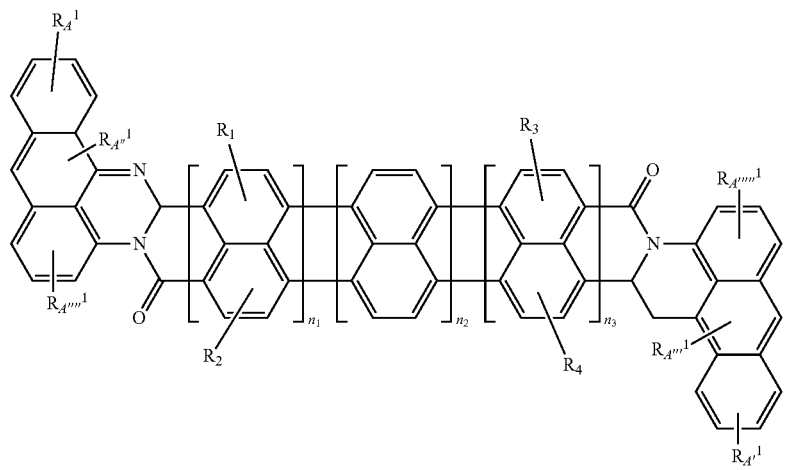

-continued
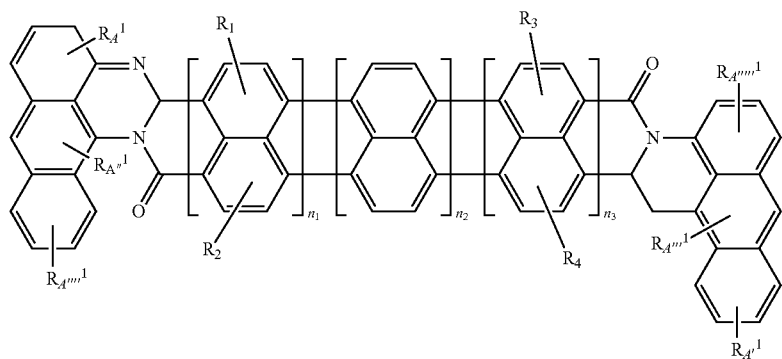
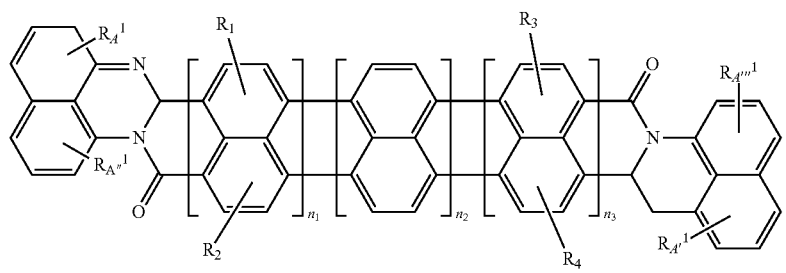
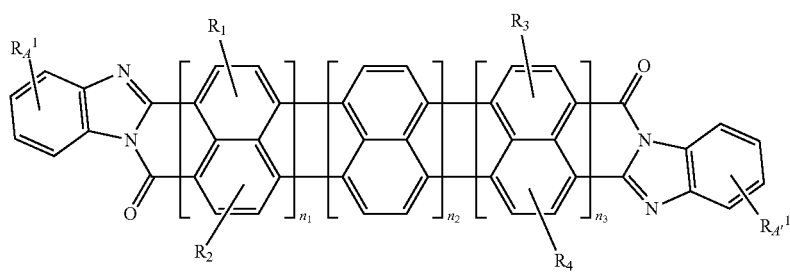
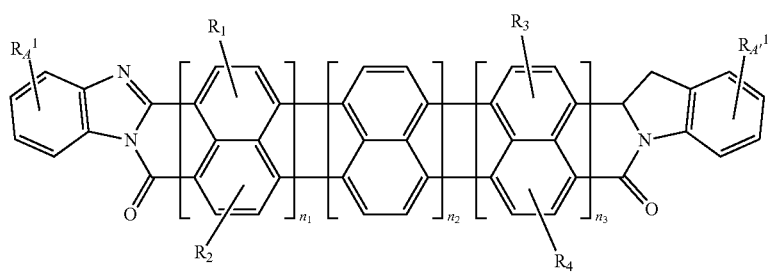
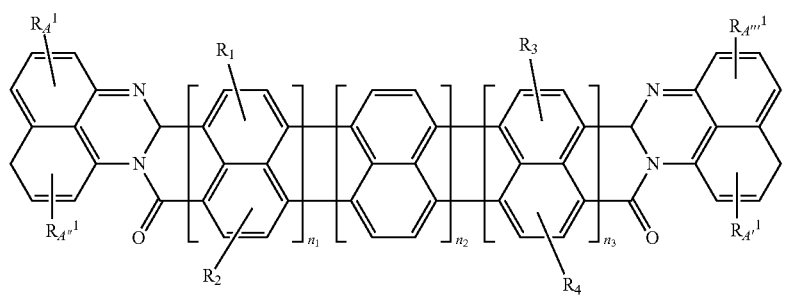

-continued

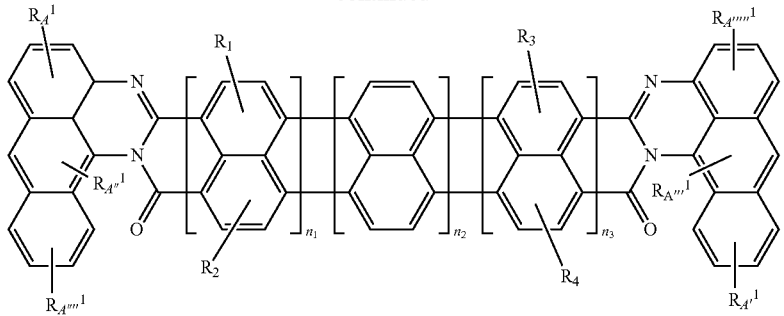

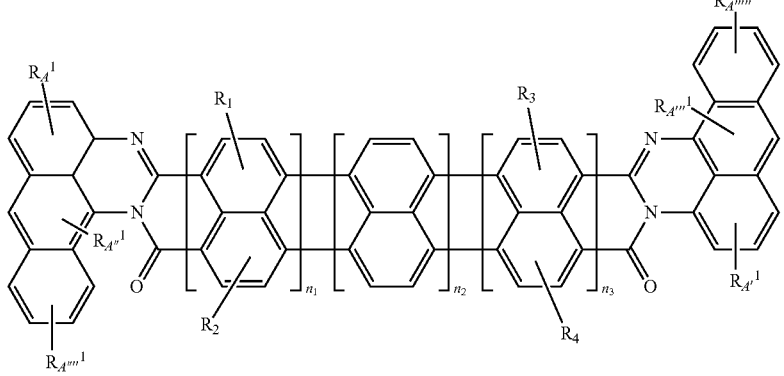

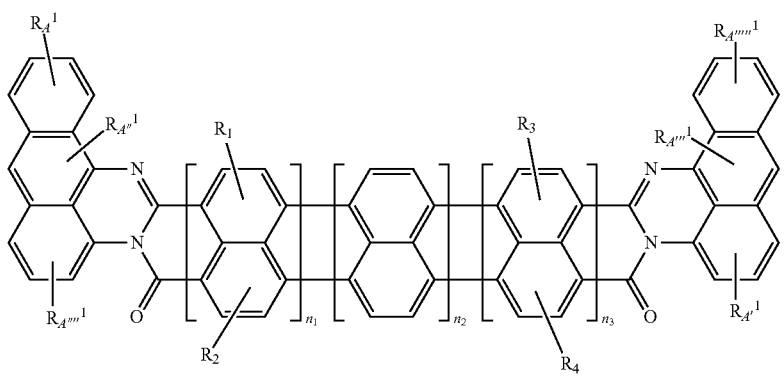

In the above examples $R_1$, $R_2$, $R_3$, and $R_4$ substituents are independently absent, a resistive tail, or a dopant group in each occurrence, $R_A^1$, $R_{A'}^1$, $R_{A''}^1$, $R_{A'''}^1$, $R_{A''''}^1$, and $R_{A'''''}^1$ are each independently absent, a resistive tail, or a dopant group, and each occurrence of $n_1$, $n_2$, and $n_3$ can be any integer independently selected from 0 to 8 with the provision that not all $n_1$, $n_2$, and $n_3$ values can equal 0.

In many implementations, but not all, the composite oligomer may include a repeating backbone and a polarizable unit in the form of one or more azo-dye chromophores. The azo-dye chromophores may be phenyl groups in conjugated connection via an azo-bridge, such that there are "n" phenyl groups and "n-1" azo-bridges where n is an integer between 2 and 16. The repeating backbone may contain a portion of the chromophore or possess a handle allowing the chromophore to be present as sidechains. Sidechains may be added to the final polymerized product or incorporated into individual monomers that are then polymerized. If incorporated into the backbone the chromophores may be modified such that they react with the other segments of the backbone to form the final product or they may be incorporated into monomers that are then polymerized.

These chromophores impart high polarizability due to delocalization of electrons. This polarizability may be enhanced by dopant groups. The composite oligomer may further include resistive tails that will provide insulation within the material. In some embodiments, the resistive tails can be substituted or unsubstituted carbon chains ($C_nX_{2n+1}$, where "X" represents hydrogen, fluorine, chlorine, or any combination thereof). In some embodiments, the resistive tails may be rigid fused polycyclic aryl groups in order to limit the motion of the sidechains, potential stabilizing van der Waals interactions between sidechains while simultaneously making the material more stable by eliminating voids. In some embodiments, the resistive tails may be rigid in order to limit voids within the material. Non-limiting examples of repeating backbones include, but are not limited to, (meth)acrylates, polyvinyls, peptides, peptoids, and polyimides.

Examples of reactions for synthesizing composite oligomers of the type described herein are shown and described below.

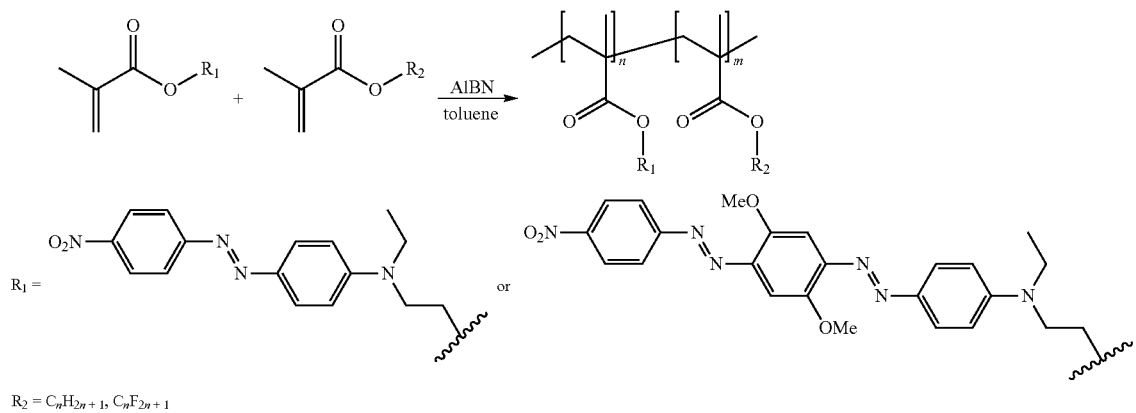
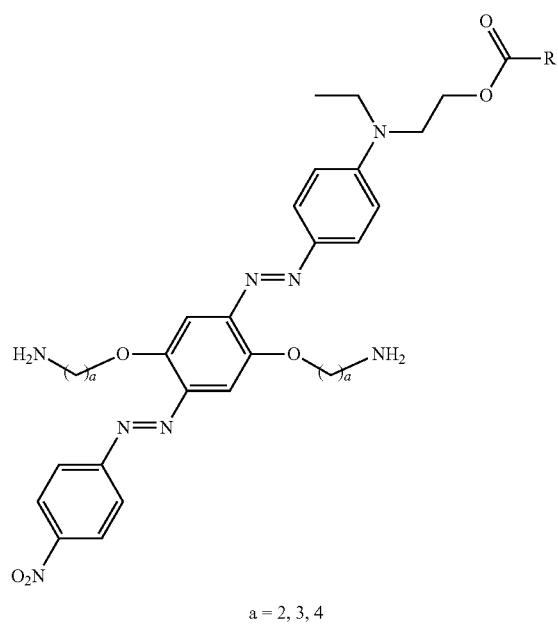
a = 2, 3, 4
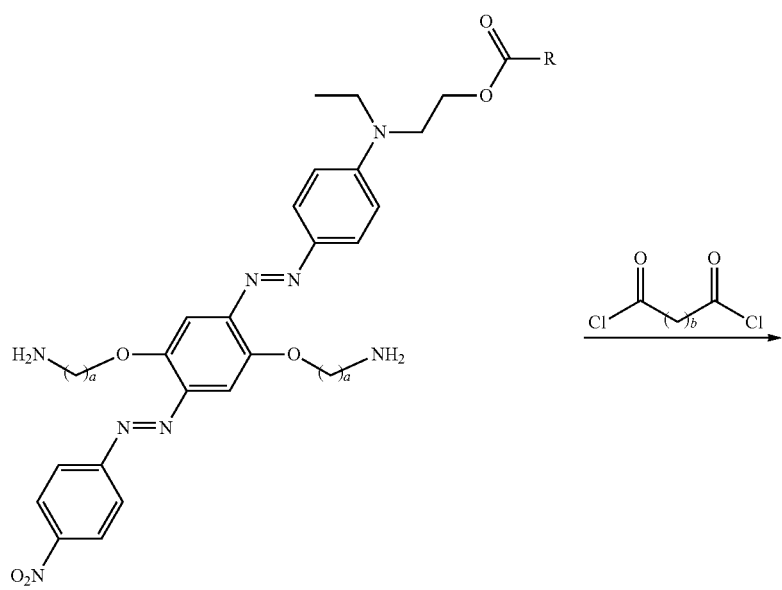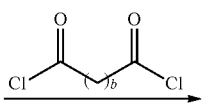
a = 2, 3, 4

-continued
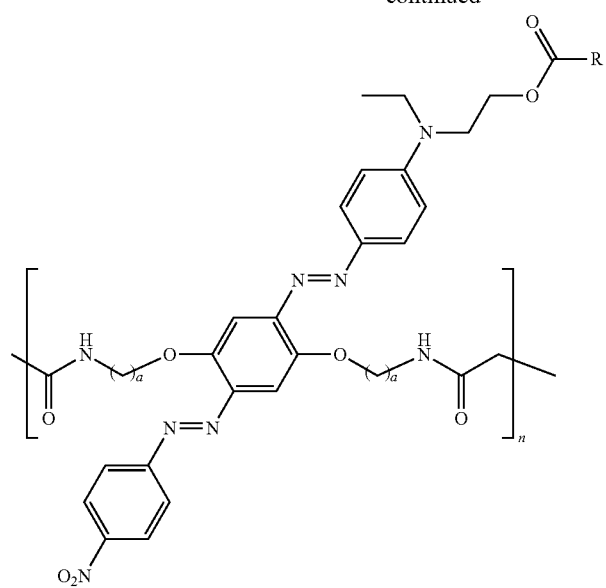
a = 2, 3, 4
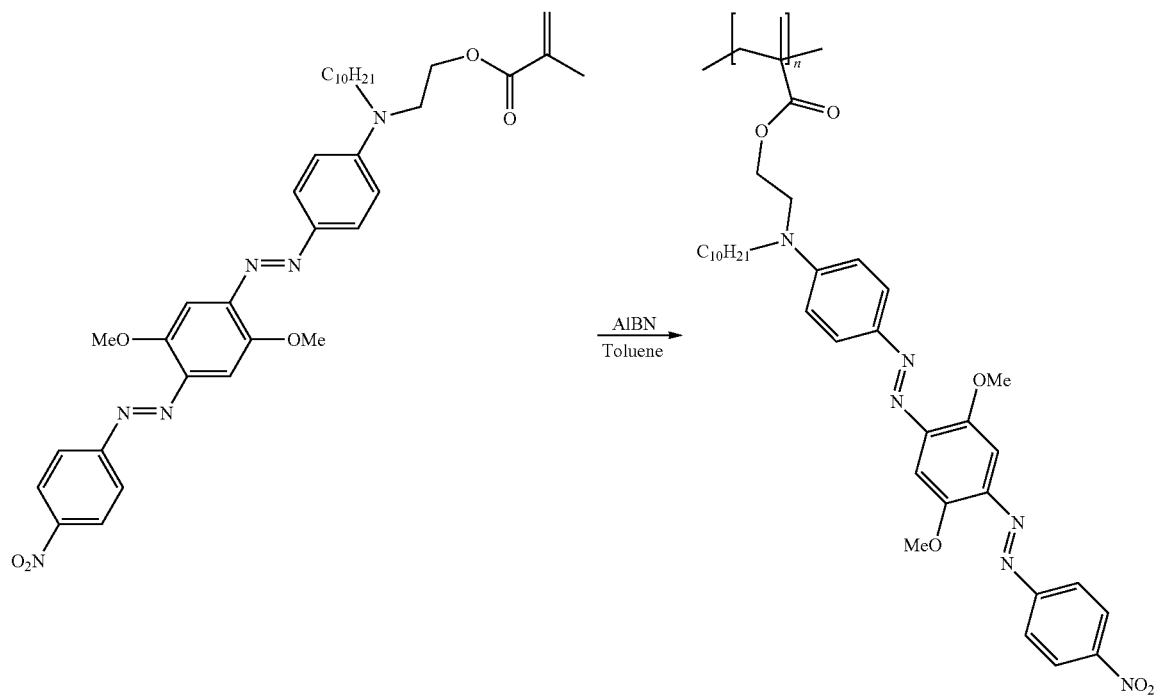

No technical complications are expected in adapting these syntheses to monomers bearing both chromophore and resistive tail, as in formula 1 from Table 1.

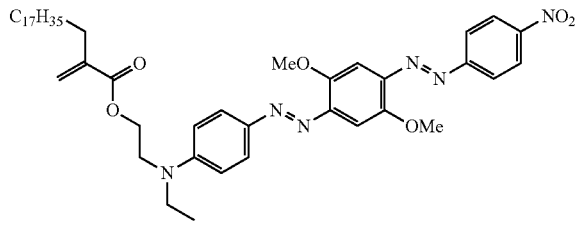

Examples of suitable chromophores are, but are not limited to, Disperse Red-1, Black Hole Quencher-1, and Black Hole Quencher-2. In many of the embodiments it may not be necessary for all monomer units to bear a chromophore, and in some it may be desirable to possess other side chains or sites within the repeating backbone that impart other qualities to the material such as stability, ease of purification, flexibility of finished film, etc.

For embodiments where the chromophores are incorporated as side chains, the resistive tails may be added before the sidechains are attached to a finished oligomer, after sidechains have been chemically added to a finished oligomer, or incorporated into the oligomer during synthesis by incorporation into monomer units.

For embodiments where the chromophore is part of the backbone the tails may be attached to the finished composite oligomer or incorporated into monomer units and added during composite synthesis.

Non-limiting examples of suitable tails are alkyl, haloalkyl, cycloakyl, cyclohaloalkyl, and polyether.

Syntheses of the four different YanLi materials described herein will be further explained.

2-((4-((E)-(2,5-dimethoxy-4-((E)-(4-nitrophenyl) diazenyl)phenyl) diazenyl)phenyl)(ethyl) amino) ethan-1-ol (1)

Fast Black K Salt (25%, 30 g) was dissolved in 250 mL acetonitrile and 250 mL NaOAc buffer solution (pH=4) and the resulting solution was stirred for 1 hour and then sonicated for 15 min, followed by vacuum filtration. The filtrate was dropwise added to a solution of 2-(ethyl(phenyl) amino)ethan-1-ol (4.1 g in 65 mL acetonitrile) at 0° C. The resultant solution was stirred at room temperature for 16 hours and the precipitate was filtered out and washed with mix solvent of acetonitrile/water (1:1) and dried under vacuum. The product was obtained as a black powder.

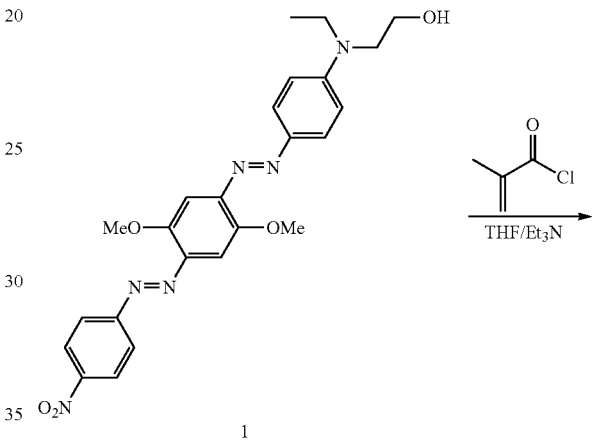

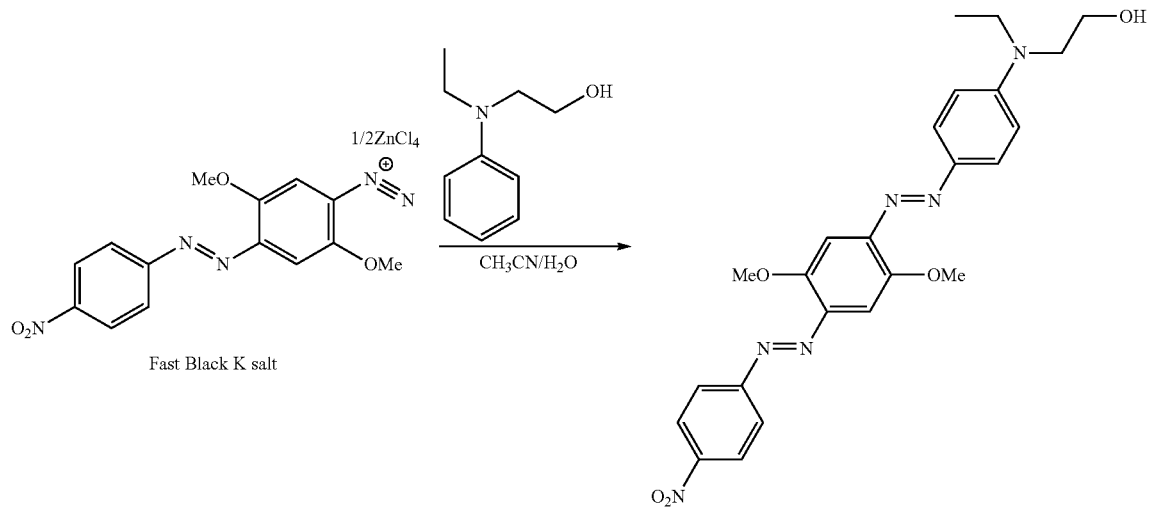

2-((4-((E)-(2,5-dimethoxy-4-((E)-(4-nitrophenyl)diazenyl)phenyl)diazenyl)phenyl)(ethyl)amino)ethyl methacrylate (2)

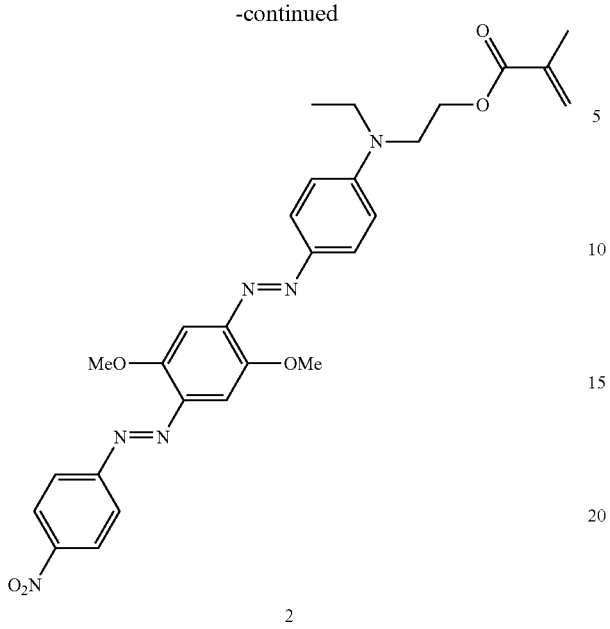

2

To the solution of compound 1 (5.0 g) and triethylamine (4.4 mL) in 70 mL THF (anhydrous) at 0° C., was dropwise added a solution of methacryloyl chloride (3.1 mL) in THF (anhydrous, 10 mL). The resulting solution was warmed up to room temperature and was stirred overnight at room temperature. The reaction solution was filtered and THF was used to wash the insoluble; the filtrate was concentrated under vacuum and diluted in dichloromethane. The diluted solution was washed with water and the solvent was removed under vacuum. The crude product was purified with column chromatography and 3.2 g pure product was isolated as a black powder.

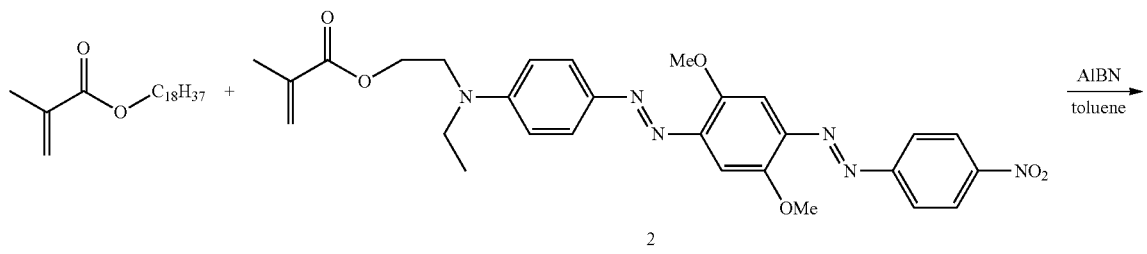

2

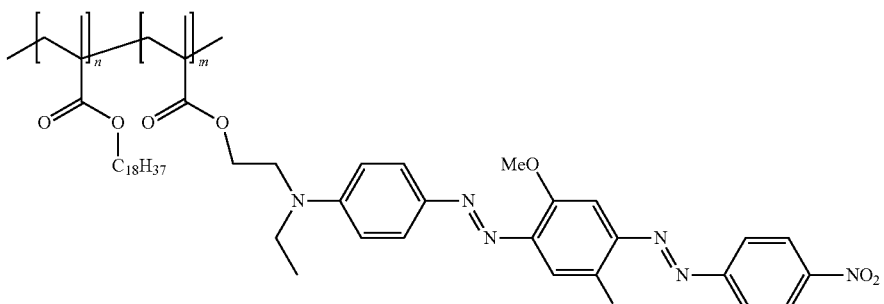

Polymer 1

Polymer 1.

Compound 2 (2.0 g), stearylmethacrylate (1.2 g) and AIBN (160 mg) were dissolved in anhydrous toluene (12 mL) in a sealed flask and the resulting solution was heated to 85° C. for 18 hours and then cooled to room temperature. The polymer was obtained by precipitating in isopropanol.

Polymer 2.

Polymer 2 was synthesized from compound 3 and stearylmethacrylate using preparation procedure of polymer 1.

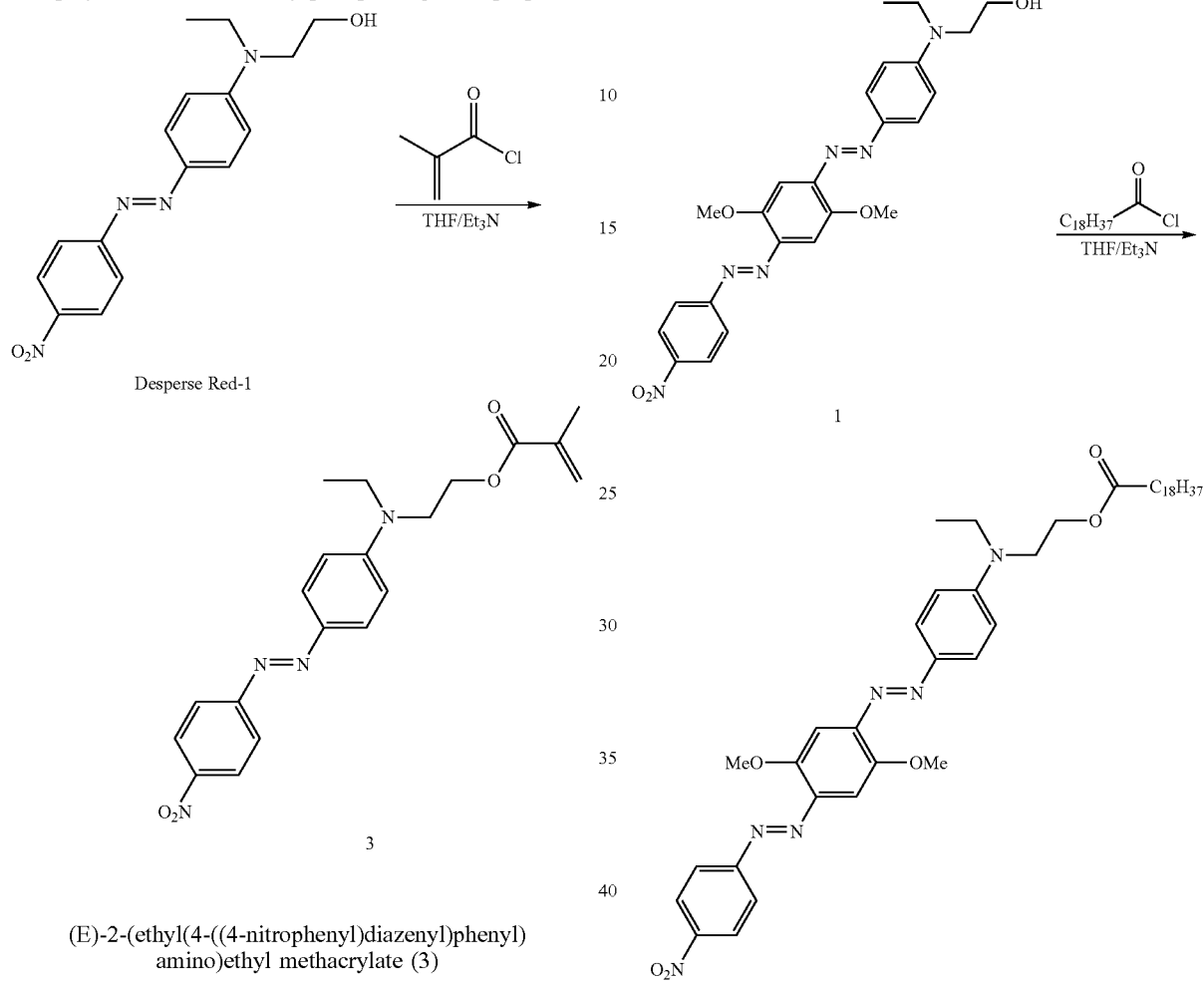

(E)-2-(ethyl(4-((4-nitrophenyl)diazenyl)phenyl)amino)ethyl methacrylate (3)

Compound 3 was synthesized from Desperse Red-1 and methacryloyl chloride using preparation procedure of compound 2.

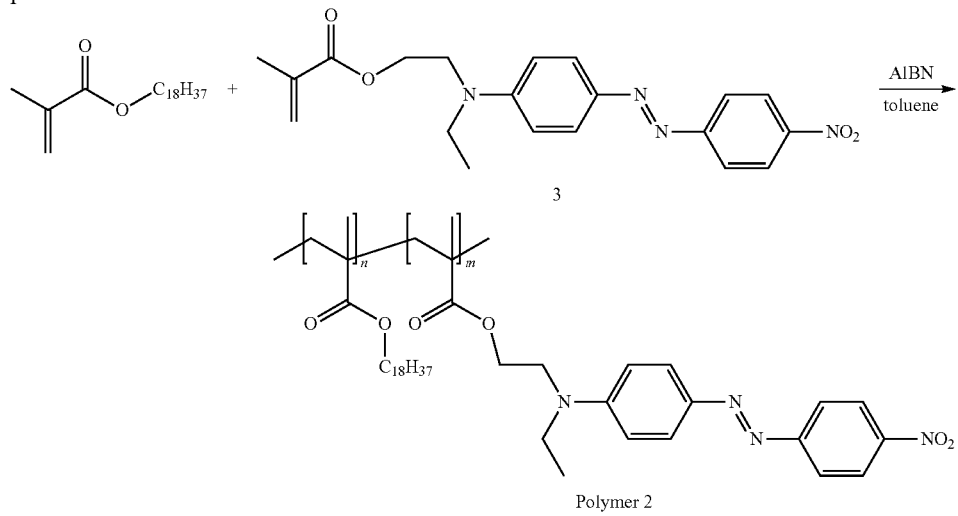

2-((4-((E)-(2,5-dimethoxy-4-((E)-(4-nitrophenyl) diazenyl)phenyl)diazenyl)phenyl) (ethyl)amino) ethyl nonadecanoate (4)

To the solution of compound 1 (0.5 g) and triethylamine (0.46 mL) in 15 mL THF at 0° C., was dropwise added a solution of stearoyl chloride (1.12 mL) in THF. The resulting solution was warmed up to room temperature and was stirred overnight at room temperature. The reaction solution was filtered and THF was used to wash the insoluble; the filtrate was concentrated under vacuum and residue was taken in dichloromethane. The crude product solution was washed with water and the solvent was removed under vacuum. The crude product was purified with column chromatography.

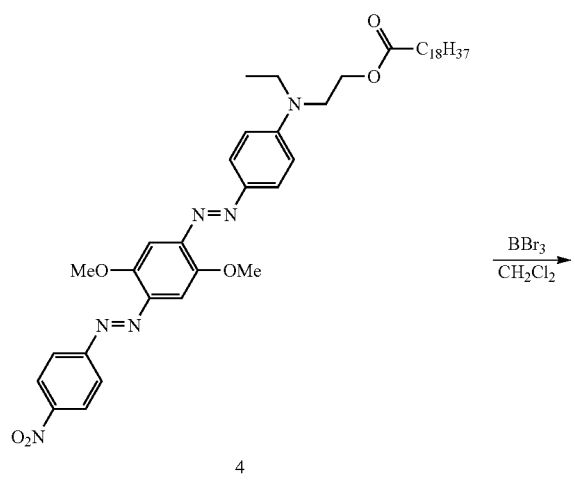

2-((4-((E)-(2,5-dimethoxy-4-((E)-(4-nitrophenyl) diazenyl)phenyl)diazenyl)phenyl)(ethyl) amino) ethyl nonadecanoate (5)

Compound 4 (1.0 g) was dissolved in dichloromethane (30 mL) and cooled to −78° C.; BBr₃ (0.72 g) was slowly added into the solution. The resulting reaction mixture was slowly warmed to room temperature and was kept at room temperature with stirring for 12 hours. Sodium bicarbonate aqueous solution was injected in the reaction mixture at 0° C. and diluted with dichloromethane. The solution was washed with water and brine, and then concentrated under vacuum. The product was purified via flash column chromatography.

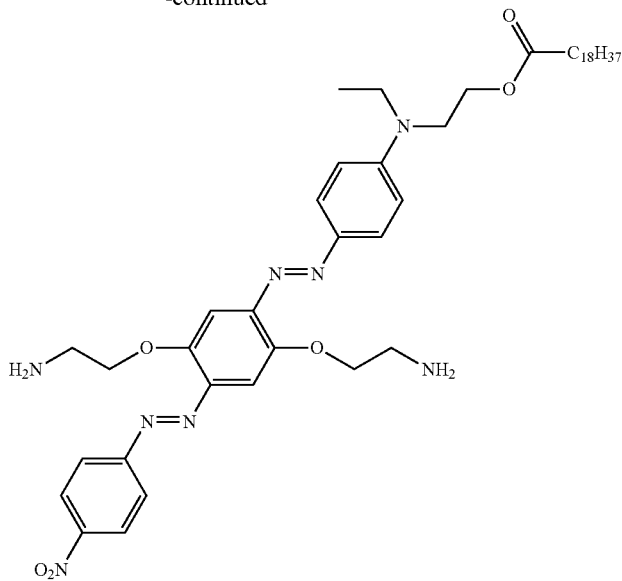

6

2-((4-((E)-(2,5-bis(2-aminoethoxy)-4-((E)-(4-nitrophenyl)diazenyl)phenyl)diazenyl)phenyl) (ethyl)amino)ethyl nonadecanoate (6)

Compound 6 (0.73 g), $K_2CO_3$ (1.38 g) and tert-butyl (2-bromoethyl)carbamate (0.44 g) were added to DMF (15 mL), and the resulting mixture was stirred at 65° C. overnight. $H_2O$ (400 mL) was added to the reaction mixture and the aqueous layer was extracted with EtOAc (200 mL×2). The combined organic layer was washed with $H_2O$ (100 mL×2) and brine (50 mL), dried over $Na_2SO_4$, filtered, and concentrated under reduced pressure. The crude product was purified by silica column chromatography. The pure product was dissolved in dichloromethane (10 mL) and TFA (3 mL) and the solution was stirred at room temperature for 2 hours. Then excess reagent and solvent were removed under vacuum. The resulting crude product was neutralized by $NaHCO_3$ solution, extracted with $CH_2Cl_2$ (3×50 mL), dried over $MgSO_4$ and evaporated. The crude product was purified by silica column chromatography.

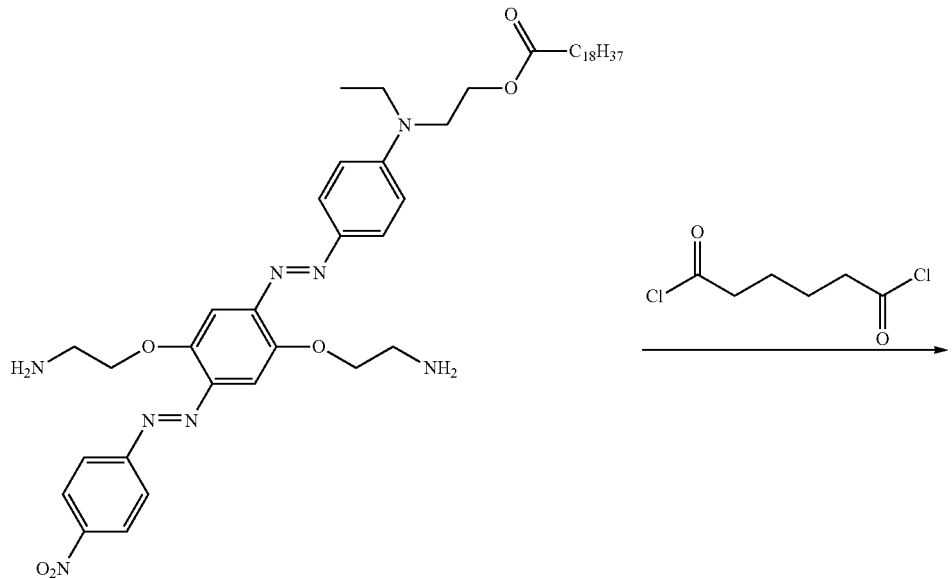

6

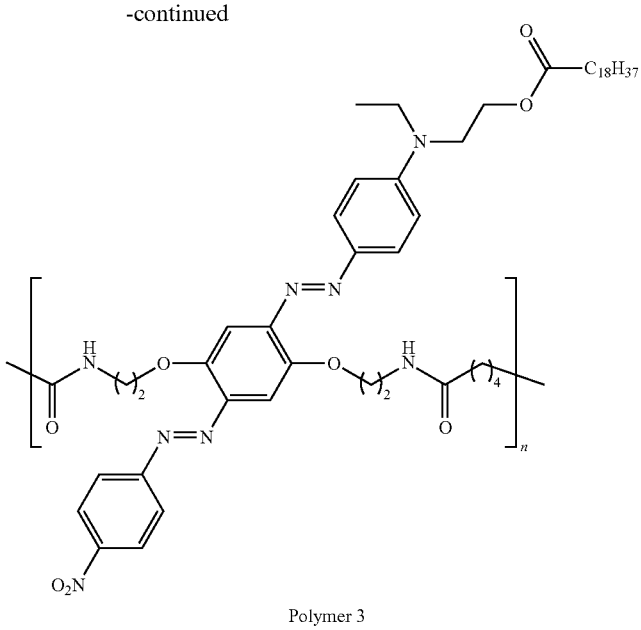

Polymer 3

Polymer 3.

To the solution of compound 6 (4.1 g) in $CH_2Cl_2$ (15 mL), was slowly added adipoyl dichloride (0.9 g) at 0° C. After the addition, the solution was allowed to warm to room temperature and stir for 2 hours. The resulting solution was concentrated and dropwise added into isopropanol to precipitate the polymer 3.

the mixture was stirred for additional 10 min. The reaction mixture was extracted with $CH_2Cl_2$, dried over $Na_2SO_4$, concentrated under vacuum and the crude mixture was purified by column chromatography on silica gel to afford the pure products.

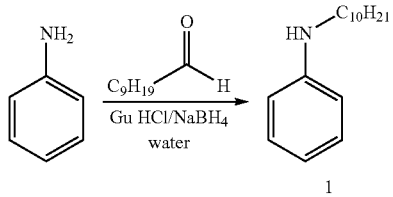

N-decylaniline (1)

To a solution containing GuHCl (10 mg, 5 mol %) in $H_2O$ (4 mL), was added decanal (2 mmol) and aniline (2.2 mmol) and the mixture vigorously stirred for 15 min at room temperature. After, $NaBH_4$ (20 mg, 2.1 mmol) was added,

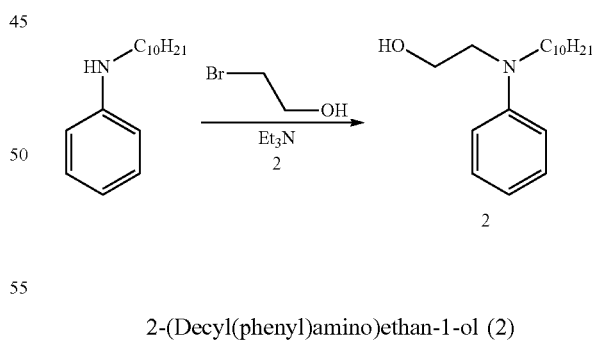

2-(Decyl(phenyl)amino)ethan-1-ol (2)

To a solution of 1 (470 mg, 2.00 mmol) in toluene (5 ml) was added triethylamine (405 mg, 4.00 mmol) and 2-bromoethanol (501 mg, 4.01 mmol), and the mixture was refluxed for 2 h. The resulting mixture was diluted with saturated $NH_4Cl$ and extracted with ethyl acetate. The extract was washed with brine, dried over anhydrous MgSO4, filtered, and concentrated in vacuo. The crude product was purified by silica gel chromatography to give 2.

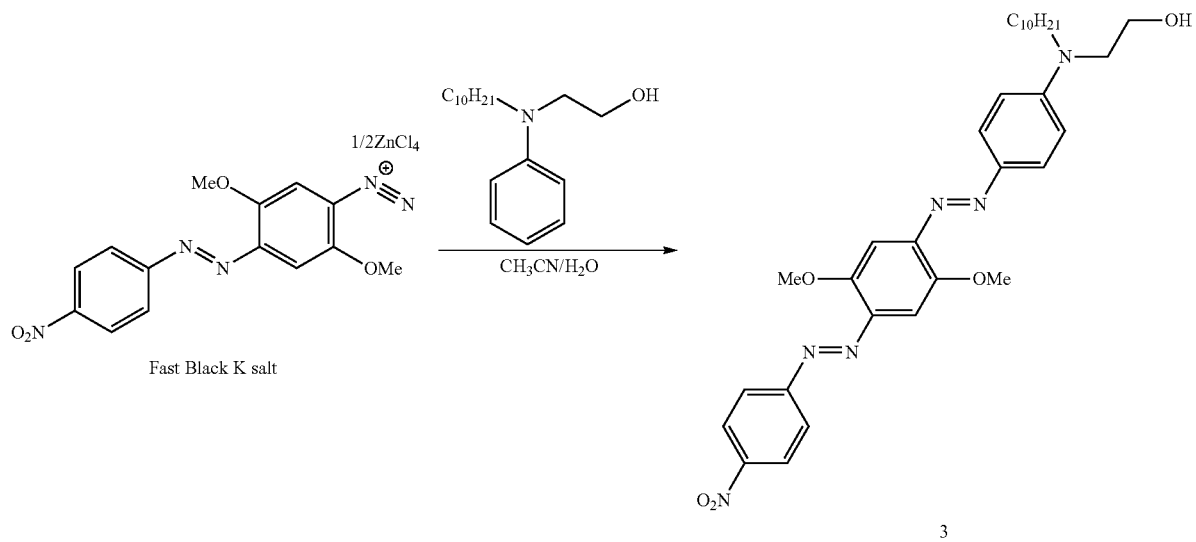

2-(Decyl(4-((E)-(2,5-dimethoxy-4-((E)-(4-nitrophenyl)diazenyl)phenyl)diazenyl) phenyl) amino)ethan-1-ol (3)

Fast Black K Salt (25%, 30 g) was dissolved in 250 mL acetonitrile and 250 mL NaOAc buffer solution (pH=4) and the resulting solution was stirred for 1 hour and then sonicated for 15 min, followed by vacuum filtration. The filtrate was dropwise added to a solution of compound 2 (6.8 g in 65 mL acetonitrile) at 0° C. The resultant solution was stirred at room temperature for 16 hours and the precipitate was filtered out and washed with mix solvent of acetonitrile/water (1:1) and dried under vacuum. The product was obtained as a black powder.

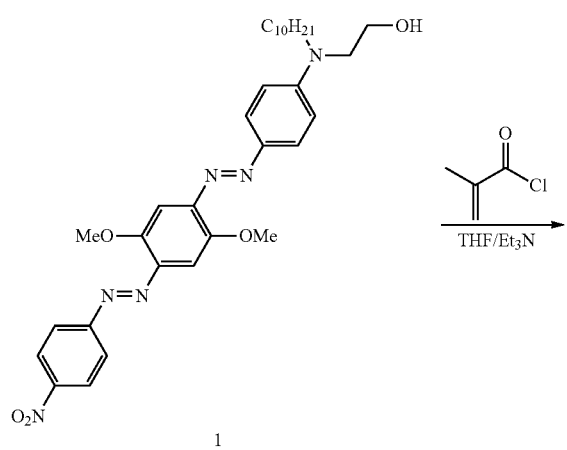

2-(decyl(4-((E)-(2,5-dimethoxy-4-((E)-(4-nitrophenyl)diazenyl)phenyl)diazenyl) phenyl) amino)ethyl methacrylate (4)

To the solution of compound 3 (5.0 g) and triethylamine (3.5 mL) in 70 mL THF (anhydrous) at 0° C., was dropwise added a solution of methacryloyl chloride (2.5 mL) in THF (anhydrous, 10 mL). The resulting solution was warmed up to room temperature and was stirred overnight at room temperature. The reaction solution was filtered and THF was used to wash the insoluble; the filtrate was concentrated under vacuum and diluted in dichloromethane. The diluted solution was washed with water and the solvent was removed under vacuum. The crude product was purified with column chromatography and 3.3 g pure product 4 was isolated as a black powder.

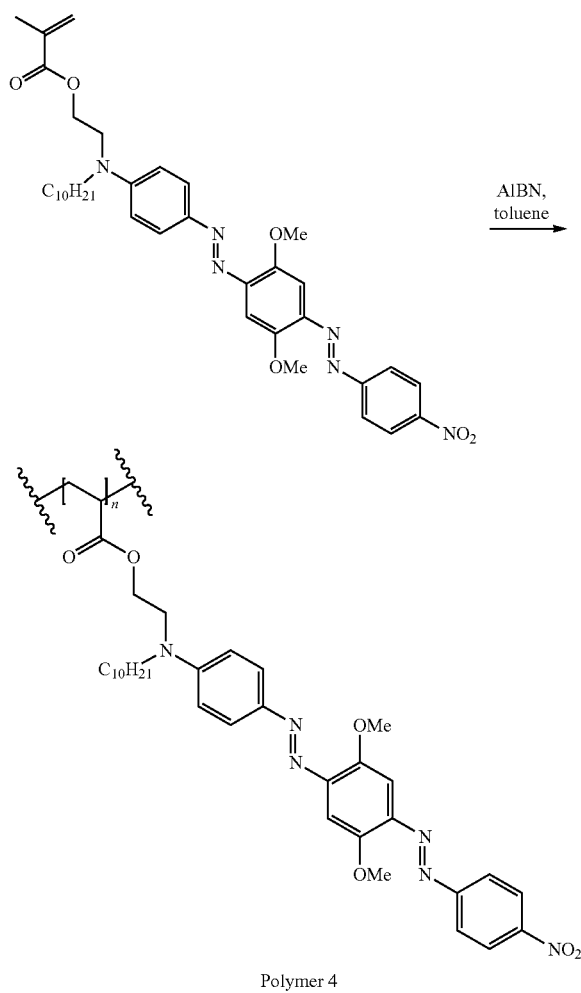
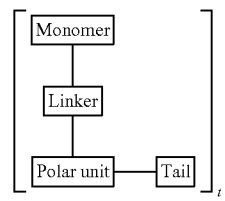

Poly 2-(decyl(4-((E)-(2,5-dimethoxy-4-((E)-(4-nitrophenyl)diazenyl)phenyl)diazenyl) phenyl) amino) ethyl methacrylate (4) (Polymer 4)

Compound 4 (2.0 g) and AIBN (40 mg) were dissolved in anhydrous toluene (6 mL) in a sealed flask and the resulting solution was heated to 85° C. for 18 hours and then cooled to room temperature. The polymer (1.4 g) was obtained by precipitating and washing in 2-isopropanol.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. As used herein, in a listing of elements in the alternative, the word "or" is used in the logical inclusive sense, e.g., "X or Y" covers X alone, Y alone, or both X and Y together, except where expressly stated otherwise. Two or more elements listed as alternatives may be combined together. The appended claims are not to be interpreted as including means-plus-function limitations, unless such a limitation is explicitly recited in a given claim using the phrase "means for."

What is claimed is:

1. A composite oligomeric material comprising:
a general structure;

$$\left[ \begin{array}{c} \boxed{\text{Monomer}} \\ | \\ \boxed{\text{Linker}} \\ | \\ \boxed{\text{Polar unit}} - \boxed{\text{Tail}} \end{array} \right]_t$$

wherein Monomer represents a repeating backbone units;
wherein the repeating backbone unit belongs to one of the groups selected from acrylates, polyvinyl, peptides, peptoids, and polyimides;
wherein Polar unit represents one or more polarizable units connected to one or more of the one or more repeating backbone units;
wherein Tail represents one or more resistive tails connected to the one or more polarizable units as a side chain on the polarizable unit or on a handle linking a polarizable unit to a backbone unit, wherein the one or more resistive tails are alkyl chains;
wherein t is $\geq 1$;
wherein Linker is COOR, wherein R is a hydrocarbon chain and wherein R is further linked to an N atom of the one or more polarizable units.

2. A composite oligomeric material as in claim 1, wherein the polarizable unit comprises an electron donor, a conjugated bridge and an electron acceptor.

3. A composite oligomeric material as in claim 1, wherein the polarizable unit is at least one chromophore.

4. A composite oligomeric material as in claim 3, wherein the at least one chromophore consists of dopant groups that enhance the polarizability of the chromophore.

5. A composite oligomeric material as in claim 4, wherein the dopant groups are independently selected from the group consisting of electron donor and electron acceptor groups; and wherein the electron donor groups are selected from amine and alkoxy groups.

6. A composite oligomeric material as in claim 5, wherein the amine groups of the type R—N—R' or R—N—R where R and R' are independently selected from the group consisting of hydrogen, resistive tails, linker groups connected to resistive tails, linker groups connected to the one or more repeating backbone units, and the one or more repeating backbone units.

7. A composite oligomeric material as in claim 3, wherein the resistive tails are covalently attached to the chromophore.

8. A composite oligomeric material in claim 3, wherein the chromophore possesses a NRR' group where R and R' are the resistive tails.

9. A composite oligomeric material as in claim 3, wherein the chromophores are azo-dye chromophores.

10. A composite oligomeric material as in claim 9, wherein the azo-dye chromophores are selected from Disperse Red-1 and Black Hole Quencher-2 and oligomers thereof.

11. A composite oligomeric material as in claim 1, wherein the resistive tails are rigid.

12. A metadielectric material comprising a structured arrangement of composite oligomeric materials according to claim 1, and having a resistivity greater than or equal to about 1016 Ohm-cm and a relative permittivity greater than or equal to about 1000.

13. A metadielectric material as in claim 12, wherein the structured arrangement of composite oligomeric materials is a crystalline structured arrangement.

14. The metadielectric material as in claim 13, wherein the crystalline structured arrangement of the composite oligomeric materials includes crystalline ordered arrangements selected from the list of thermotropic and isotropic crystal ordering.

15. A metadielectric material as in claim 12, wherein the structured arrangement of composite oligomeric materials includes lamella or lamella-like structures.

16. A capacitor comprising a first conductive layer, a second conductive layer, and a dielectric layer sandwiched between the first and second conductive layers; wherein the dielectric layer is a film comprised of a metadielectric material that has a resistivity greater than or equal to about 1016 Ohm-cm, a relative permittivity greater than or equal to about 1000, wherein the metadielectric material includes the composite oligomeric material of claim 1.

17. A capacitor as in claim 16, further comprising an insulating layer, wherein the dielectric layer is a thin film, the first and second conductive layers are metal, and the insulating layer is independently selected from a list including a metadielectric material, polypropylene (PP), polyethylene terephthalate polyester (PET), polyphenylene sulfide (PPS), polyethylene naphthalate (PEN), polycarbonate (PP), polystyrene (PS), and polytetrafluoroethylene (PTFE).

18. A capacitor as in claim 16, wherein the dielectric layer includes a polymer with the metadielectric material suspended as a guest in a guest-host system.

19. A capacitor as in claim 16, wherein the host polymer is selected from poly(methyl methacrylate), polyimides, polycarbonates, and poly(ε-caprolactone).

20. A capacitor as in claim 16, wherein the metadielectric material is incorporated into a larger polymer matrix wherein the polymer matrix may possess the same or different repeating backbone unit as the metadielectric material.

21. A capacitor as in claim 16, wherein the composite oligomeric material is capable of forming structures selected from the list of lyotropic crystal structures, thermotropic crystal structures, lamella structures, and lamella-like structures.

22. The composite oligomeric material of claim 1, wherein the hydrocarbon chain comprises 2, 3, 4, 5, 6 or 7 C atoms.

* * * * *